(12) United States Patent
Erickson et al.

(10) Patent No.: US 9,014,827 B2
(45) Date of Patent: Apr. 21, 2015

(54) DYNAMICALLY GENERATING A MANUFACTURING PRODUCTION WORK FLOW WITH SELECTABLE SAMPLING STRATEGIES

(75) Inventors: Steven C. Erickson, Rochester, MN (US); Ivory W. Knipfer, Rochester, MN (US); Jason S. Lee, Oronoco, MN (US); Antoine G. Sater, Rochester, MN (US); Matthew H. Zemke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1121 days.

(21) Appl. No.: 12/687,616

(22) Filed: Jan. 14, 2010

(65) Prior Publication Data

US 2011/0172799 A1 Jul. 14, 2011

(51) Int. Cl.
G05B 13/00 (2006.01)
G05B 21/02 (2006.01)
G06Q 10/06 (2012.01)
G06Q 50/04 (2012.01)

(52) U.S. Cl.
CPC .............. *G06Q 50/04* (2013.01); *G06Q 10/06* (2013.01)

(58) Field of Classification Search
CPC ... G06Q 10/06; G06Q 50/04; G05B 19/41875
USPC .......... 700/28–32, 51, 73, 99–102, 108–111; 702/31, 81–84; 705/7.11–7.13, 705/7.22–7.27
See application file for complete search history.

(56) References Cited

U.S. PATENT DOCUMENTS

| 5,225,293 | A | 7/1993 | Mitchell et al. |
| 5,323,837 | A | 6/1994 | Stummer |
| 6,477,432 | B1 | 11/2002 | Chen et al. |
| 6,546,364 | B1 * | 4/2003 | Smirnov et al. ................. 703/22 |
| 6,577,972 | B2 | 6/2003 | Yanaru et al. |
| 6,801,820 | B1 | 10/2004 | Lilly et al. |
| 6,868,299 | B2 | 3/2005 | Chandra et al. |

(Continued)

OTHER PUBLICATIONS http://www.stat.fi/tk/tt/laatuatilastoissa/lm020500/sp_en.html, "Quality Guidelines for Official Statistics", printed Jan. 14, 2010.

(Continued)

*Primary Examiner* — M. N. Von Buhr
(74) *Attorney, Agent, or Firm* — Penny L. Lowry; Grant Johnson

(57) ABSTRACT

A method for dynamically altering manufacturing routings to add, remove, or skip operations and combinations of operations within a shop floor control system in real-time to respond to current conditions. One aspect of the present invention is a computer-implemented method for dynamically generating a manufacturing production work flow. One embodiment of this method comprises receiving indication that an assembly has completed a manufacturing operation, the assembly having a work flow and a sampling strategy associated therewith; querying a data source for characteristics of a plurality of previously sampled components; querying a manufacturing floor control system for current production status; and dynamically updating the work flow for the assembly based at least in part on the sampling strategy, characteristics of the plurality of previously sampled components, and the current production status.

21 Claims, 24 Drawing Sheets

(56) References Cited

U.S. PATENT DOCUMENTS

| | | | |
|---|---|---|---|
| 6,909,933 B2* | 6/2005 | Maeritz | 700/121 |
| 6,922,600 B1* | 7/2005 | Conrad et al. | 700/108 |
| 6,965,895 B2* | 11/2005 | Smith et al. | 1/1 |
| 6,968,251 B2* | 11/2005 | Lin et al. | 700/109 |
| 6,975,914 B2* | 12/2005 | DeRemer et al. | 700/96 |
| 7,032,816 B2* | 4/2006 | Markham et al. | 235/376 |
| 7,039,482 B2* | 5/2006 | Hsu et al. | 700/99 |
| 7,174,230 B2* | 2/2007 | Arackaparambil et al. | 700/96 |
| 7,242,991 B2* | 7/2007 | Budinger et al. | 700/95 |
| 7,248,998 B2* | 7/2007 | De Martini | 702/182 |
| 7,289,966 B2* | 10/2007 | Ouchi | 705/7.13 |
| 7,315,765 B1* | 1/2008 | Ranft et al. | 700/108 |
| 7,783,375 B2* | 8/2010 | Shanmugasundram et al. | 700/121 |
| 7,865,867 B2* | 1/2011 | Potter et al. | 717/101 |
| 7,912,568 B2* | 3/2011 | Bagwell et al. | 700/103 |
| 8,046,734 B2* | 10/2011 | Brown et al. | 717/104 |
| 8,150,541 B2* | 4/2012 | Moore et al. | 700/103 |
| 8,175,831 B2* | 5/2012 | Izikson et al. | 702/83 |
| 8,229,587 B2* | 7/2012 | Shieh et al. | 700/112 |
| 8,306,645 B2* | 11/2012 | Giebels | 700/105 |
| 8,315,898 B2* | 11/2012 | Fromherz | 705/7.12 |
| 8,359,244 B1* | 1/2013 | Fukuya | 705/26.5 |
| 2002/0130069 A1 | 9/2002 | Moskoff | |
| 2003/0034450 A1 | 2/2003 | Karger et al. | |
| 2003/0235418 A1 | 12/2003 | Furno et al. | |
| 2005/0075748 A1* | 4/2005 | Gartland et al. | 700/108 |
| 2005/0149210 A1* | 7/2005 | Britton | 700/51 |
| 2006/0024840 A1 | 2/2006 | Conquorgood et al. | |
| 2006/0229923 A1* | 10/2006 | Adi et al. | 705/8 |
| 2007/0050070 A1* | 3/2007 | Strain et al. | 700/99 |
| 2007/0078703 A1* | 4/2007 | Shipley et al. | 705/11 |
| 2007/0139409 A1 | 6/2007 | Anderson et al. | |
| 2007/0139432 A1 | 6/2007 | Anderson et al. | |
| 2007/0139433 A1 | 6/2007 | Anderson et al. | |
| 2008/0011061 A1 | 1/2008 | Sihalla | |
| 2008/0263081 A1 | 10/2008 | Hurtis et al. | |
| 2009/0088871 A1* | 4/2009 | Moor et al. | 700/30 |
| 2011/0022193 A1* | 1/2011 | Panaitescu | 700/29 |
| 2011/0153051 A1* | 6/2011 | Bachman et al. | 700/96 |
| 2011/0230994 A1* | 9/2011 | Spearman | 700/99 |
| 2012/0078679 A1* | 3/2012 | Hodges et al. | 705/7.27 |

OTHER PUBLICATIONS

Shiau, Y. et al., "Concurrent process/inspection planning for a customized manufacturing system based on genetic algorithm," Received: Apr. 26, 2005 / Accepted: Oct. 30, 2005 /Published online: May 23, 2006 Copyright Springer-Verlag London Limited 2006.

Ulas, S., "Role of Sampling in Process Design, Optimization and Control," http://web.archive.org/web/20070629231006/http://aiche.confex.com/aic . . . (last modified Friday, Nov. 17, 2006 10:35 AM; last accessed Sep. 10, 2014 10:31 AM).

* cited by examiner

Sampling Strategy WIP

| Product Group 171 | Sequence 172 | Activation Criteria 173 | Invoking Operations (Alias) 174 | Sampling Exclusion Criteria 175 |
|---|---|---|---|---|
| LE Servers | 1 | END_OF_QTR | 1.FO10<br>2.VI10<br>3.FO20<br>4.RO20 | 1.QA_STATION_AVAIL<br>2.*NONE<br>3.NOT_QTR_END_SCHD<br>4.NOT_QTR_END_SCHD |

| Conditions 176 | Sampling Program Type 177 | Mfg Entity Level 178 | WIP Item 179 |
|---|---|---|---|
| *ALL<br>*OPT<br>*ALL<br>*OPT | 1.FOT<br>2.PART<br>3.FOT<br>4.RATE | 1.WU<br>2.WU<br>3.MFGN<br>4.MFGN | 0001ABC |

| MFGN | WU | Dim 1 Results | Dimension 2 Results |
|---|---|---|---|
| 0001ABC | 20000001 | Added OP 42 | Did not add since optional and D1 already satisfied optional requirement |
| | 20000002 | Not added – failed FOT test | Added Operation 66 since this work unit part sampling audit and previous optional requirements were NOT satisfied by D1. |
| | 20000003 | Added OP 43 | Did not add since optional and D1 already satisfied optional requirement |

FIG. 1B-2

| Dim. 3 Results | Dimension 4 Results |
|---|---|
| Added MFGN Level for FOT (all WUs) | Skipped Rate based since optional at MFGN level and D3 already satisfied optional requirement |

First_Config Requirements Control Table — 186

| Product Group | Config Analysis Level/Method | Operation | Required Frequency (days) | Required Quantity |
|---|---|---|---|---|
| LE Server | MTM+Feature | VI10 | 30 | 1 |
| LE Server | MTM+BOMs | QA99 | 60 | 5 |
| *ALL | MTM+Feature | VI70 | 30 | 1 |

First_Config History Table — 184

| Config ID | Mach Type | Model | Order Number | Operation Completed | Date Verified |
|---|---|---|---|---|---|
| 123987234512 3A | 7825 | 100 | 1A23446 | 0020 | 2008-03-01 |
| 21839609 8A8190 | 7832 | R62 | 1A89768 | QA99 | 2008-03-01 |
| 908209873208 7A | 7844 | 700 | 1A82193 | 0020 | 2008-03-01 |

DYNAMICALLY GENERATING A MANUFACTURING PRODUCTION WORK FLOW WITH SELECTABLE SAMPLING STRATEGIES

BACKGROUND OF THE INVENTION

1. Field of the Invention

The present invention is generally related to manufacturing floor control systems and methods, and more specifically, to a method for dynamically generating work flows for components based on sensed production activities and/or order characteristics.

2. Description of the Related Art

Today's customers demand that products be tailored to their specifications and be delivered in a ready-to-use manner. They also demand the lowest possible cost. These conflicting demands place great pressure on manufacturing organizations to efficiently produce solutions based on customer specifications.

As product complexity increases and product life cycles become shorter, it is increasingly difficult to verify product configurations or permutations prior to shipment. Currently, three techniques are used. The first, percentage sampling, involves defining a percentage of products that must be routed through a specific inspection step or operation somewhere in the manufacturing process. For fixed products that are all identical, statistical process control (SPC) can be used to determine optimum sampling rates, etc. This process is most effective in a high-volume business that has little variation product content, single-unit based manufacturing (i.e., units of 1), and constant cycle times.

The second technique, 100% inspection, involves routing each and every assembly through a specific inspection step or operation somewhere in the manufacturing process to ensure quality. The third technique, operator training, involves training on employees to recognize problems during the normal process steps and then relying on judgment to take appropriate actions. The second and third approaches are more effective in a low volume, high margin businesses.

SUMMARY OF THE INVENTION

The present invention provides a method for dynamically altering manufacturing routings to add, remove, or skip operations and combinations of operations within a shop floor control system, both at the present step and at future steps in the routing map or tree, considering all of the factors present when the new routing is generated. Significantly, the dynamic work flow adjustment is not limited to a pre-defined set of possibilities. That is, the manufacturing entity does not need to pre-define all possible routing maps ahead of time. Embodiments can build and modify routings in real-time, as the assembly is built.

Embodiments of the present invention may also provide for dynamically controlling the interaction of more than one sampling method on any given product at any one time. That is, these embodiments blend and adjust routings based on multiple sampling strategies operative on the same assembly. In addition, embodiments of the invention may dynamically generate sampling orders for complex configured products where the configuration determines the sampling plan desired, or where past actions and analysis are taken into account to develop future sampling in future production cycles.

One aspect of the present invention is a computer-implemented method for dynamically generating a manufacturing production work flow. One embodiment of this method comprises receiving indication that an assembly has completed a manufacturing operation, the assembly having a work flow and a sampling strategy associated therewith; querying a data source for characteristics of a plurality of previously sampled components; querying a manufacturing floor control system for current production status; and dynamically updating the work flow for the assembly based at least in part on the sampling strategy, characteristics of the plurality of previously sampled components, and the current production status.

Another aspect of the present invention is a method for deploying computing infrastructure, comprising integrating computer readable program code into a computing system, wherein the code in combination with the computing system is adapted to perform a method for generating a manufacturing production work flow. The method for generating a manufacturing production work flow, in turn, comprises receiving indication that an assembly has completed a manufacturing operation, the assembly having a work flow and a sampling strategy associated therewith; querying a data source for characteristics of a plurality of previously sampled components; querying a manufacturing floor control system for current production status; and dynamically updating the work flow for the assembly based at least in part on the sampling strategy, characteristics of the plurality of previously sampled components, and the current production status.

Another aspect of the present invention is a system, comprising a processing unit and a memory operatively connected to the processing unit. In one embodiment, the memory contains an adaptive engine configured to receive indication that an assembly has completed a manufacturing operation, the assembly having a work flow and a sampling strategy associated therewith; query a data source for characteristics of a plurality of previously sampled components; query a manufacturing floor control system for current production status; and dynamically update the work flow for the assembly based at least in part on the sampling strategy, characteristics of the plurality of previously sampled components, and the current production status.

One feature and advantage of some embodiments is that they provide the ability for a manufacturing floor control system to sense changes in throughput and automatically adjust sampling to keep a smoother rate. For example, embodiments can adjust with varying manufacturing activities, such as: short parts, priority changes, critical order situations, revenue trade-offs, quality holds, etc. Some embodiments may also support combinatorial methods (i.e., multiple sampling strategies in effect at the same time) and support multiple dimensions (i.e., account for sampling activities driven from other processes, product, etc.)

Another feature and advantage of some embodiments is that, unlike conventional statistical quality control techniques, coverage can be ensured for uniquely configured products and, in cases where new configurations are ordered in batches by customers, to identify which one will complete the manufacturing process first and thus should be verified to validate the entire shipment or batch. This, in turn, ensures less product escapes and customer quality issues are contained at the manufacturing location, while limiting quality inspection resources to minimum level required to maintain/ensure quality targets are being met prior to shipment.

Yet another feature and advantage of some embodiments is that they allow for real-time controlled response to containing quality issues as they are detected, without requiring 'armies' of people finding/tracking machines on a production floor. These embodiments help ensure adequate testing is performed when product or process changes are released, especially when the first instance of a customer order to be affected by the changes is not known when released into production.

Embodiments of the present invention are also desirable because they provide the ability to have sampling algorithms impact future activities. Thus, for example, one embodiment can determine that when completing operation X, you need to do a random sampling at operation X+1, but since you inserted operation X+1 after operation X, you also need to add operations Y1, Y2, and Y3 later in manufacturing as operations X+20, X+21, and X+22.

In addition, some embodiments are desirable because they can look at manufacturing impacts on an order by order basis to steer sampling to avoid production cycle time issues. Thus, for example, if a product needs certain percentage sampling on a product line, but an order is running late due to supply constraints, embodiments can pick an alternative candidate and still met the required compliance percentage.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments illustrated by the appended drawings. These drawings, however, illustrate only typical embodiments of the invention and are not limiting of its scope, for the invention may admit to other equally effective embodiments.

FIGS. 1B-1C depict some sample tables in the WIP database.

DETAILED DESCRIPTION

Figure 1A:
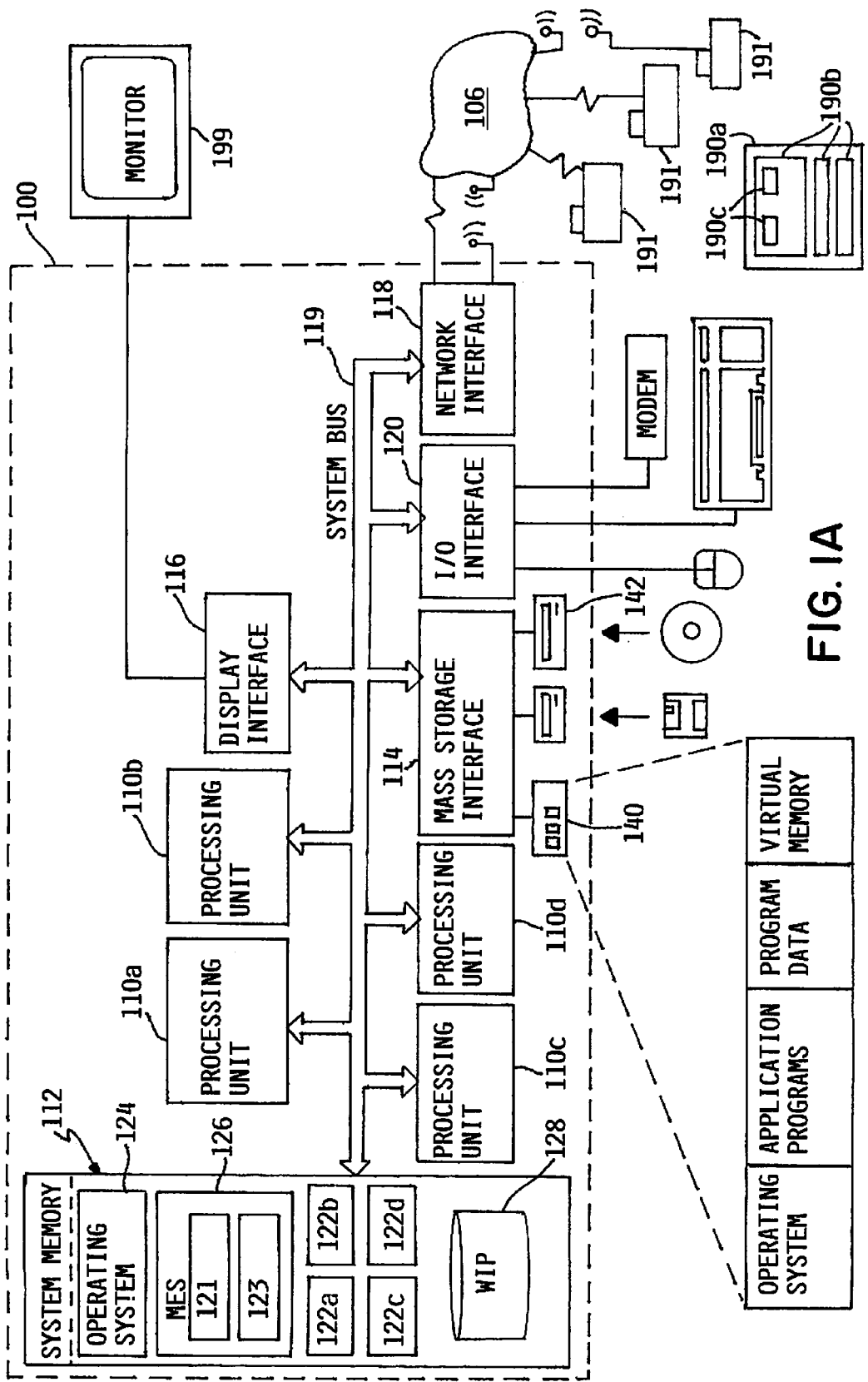
FIG. 1A shows one embodiment of a manufacturing floor control system.

FIG. 1A shows one embodiment of a manufacturing floor control system 100 capable of dynamically altering manufacturing work flows in real time based on multiple sampling strategies and changing product configurations on an individual unit basis. This manufacturing floor control system 100 comprises one or more central processing units 110a-110d ("CPU") connected to a main memory unit 112 by a system bus 119. The main memory 112 contains an operating system 124, manufacturing execution system (MES) 126, and a work in progress database (WIP) 128. The MES 126, in turn, comprises an adaptive engine 121 and a fingerprint ID service 123, and is in communication with an external first off test (FOT) sampling strategy program 122a, an external rate/qualify (RATE) sampling strategy program 122b, and an external special configuration sampling strategy program 122c (collectively sampling programs 122). The MES 126 controls the flow of a plurality of manufacturing number (MFGN) assemblies 190a, work units 190b, sub-work-units 190c, etc (for clarity, all of the various product levels will be referred to herein as assemblies 190) past a variety of managed stations 191. At some of the managed stations 191, assembly tasks are performed; at others, inspection tasks are performed.

This manufacturing floor control system embodiment 100 further comprises a mass storage interface 114, a terminal/display interface 116, a network interface 118, and an input/output ("I/O") interface 120 by the system bus 119. The mass storage interfaces 114, in turn, connect the system bus 119 to one or more mass storage devices, such as a direct access storage device 140 or a readable/writable optical disk drive 142. The network interfaces 118 allow the manufacturing floor control system 100 to communicate with the managed stations 191 over a communications medium 116.

As best shown in FIGS. 1B-1C, the WIP database 128 contains a sampling strategy table 180 comprising a plurality of WIP records 170 (one shown for clarity). Each WIP record 170 contains a product group field 171, a sequence field 172, an activation criteria field 173, an invoking operation field 174, a sampling exclusion criteria field 175, a conditions field 176, a sampling program type field 177, a manufacturing entity level field 178, and a WIP item field 179. The WIP database 128 also contains a WIP history table 181 containing a plurality of WIP records 182a-182c containing a running history of each WIP item 179; a first_config history table 184 a date on which each unique assembly 190 was first built; and a first_config requirements table 186 that defines the specific operation(s), quantity, and expiration date(s) that will be done for each type of assembly.

Figure 2A:
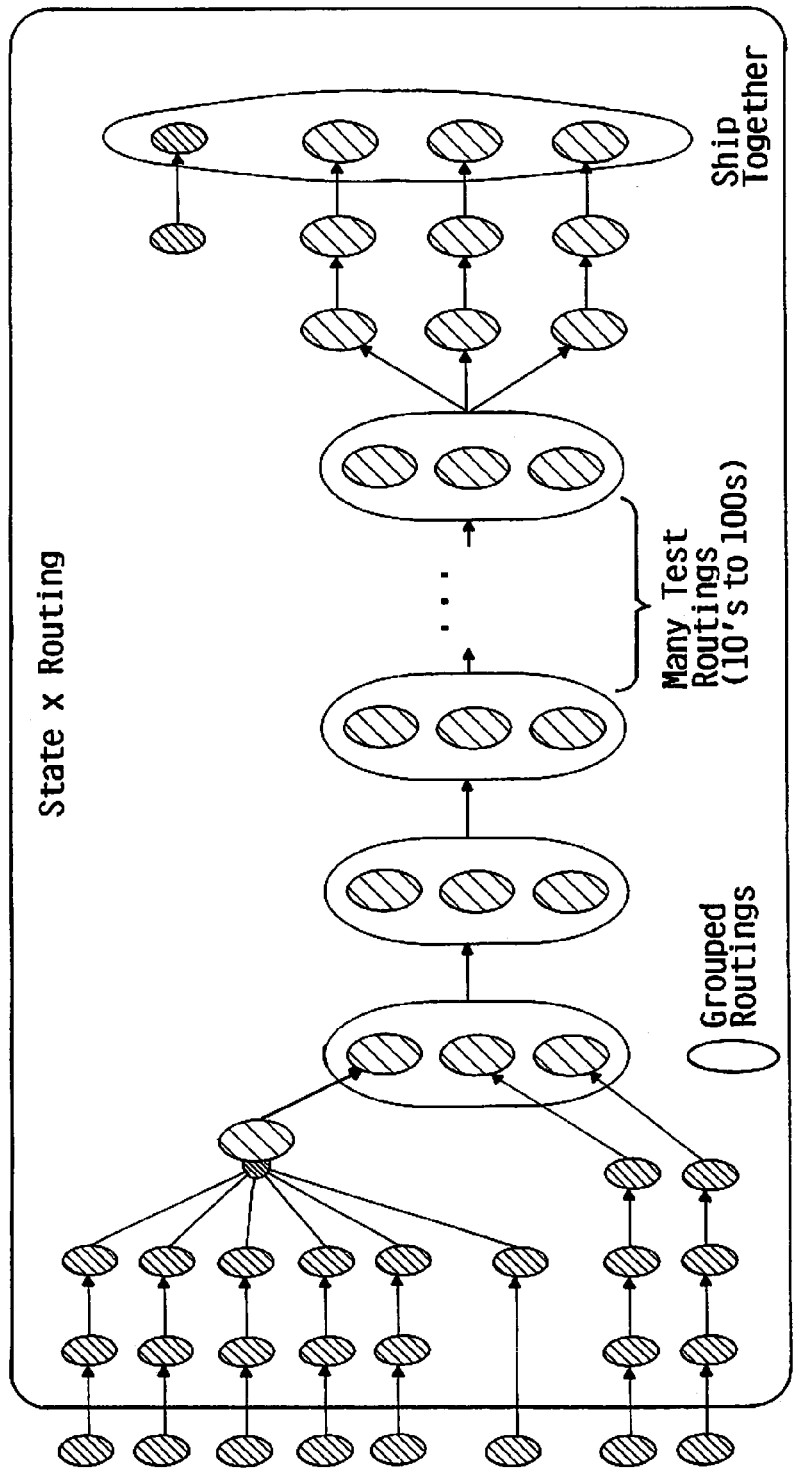
FIG. 2 is a high-level overview of one embodiment of the present invention in operation
Figure 2B:
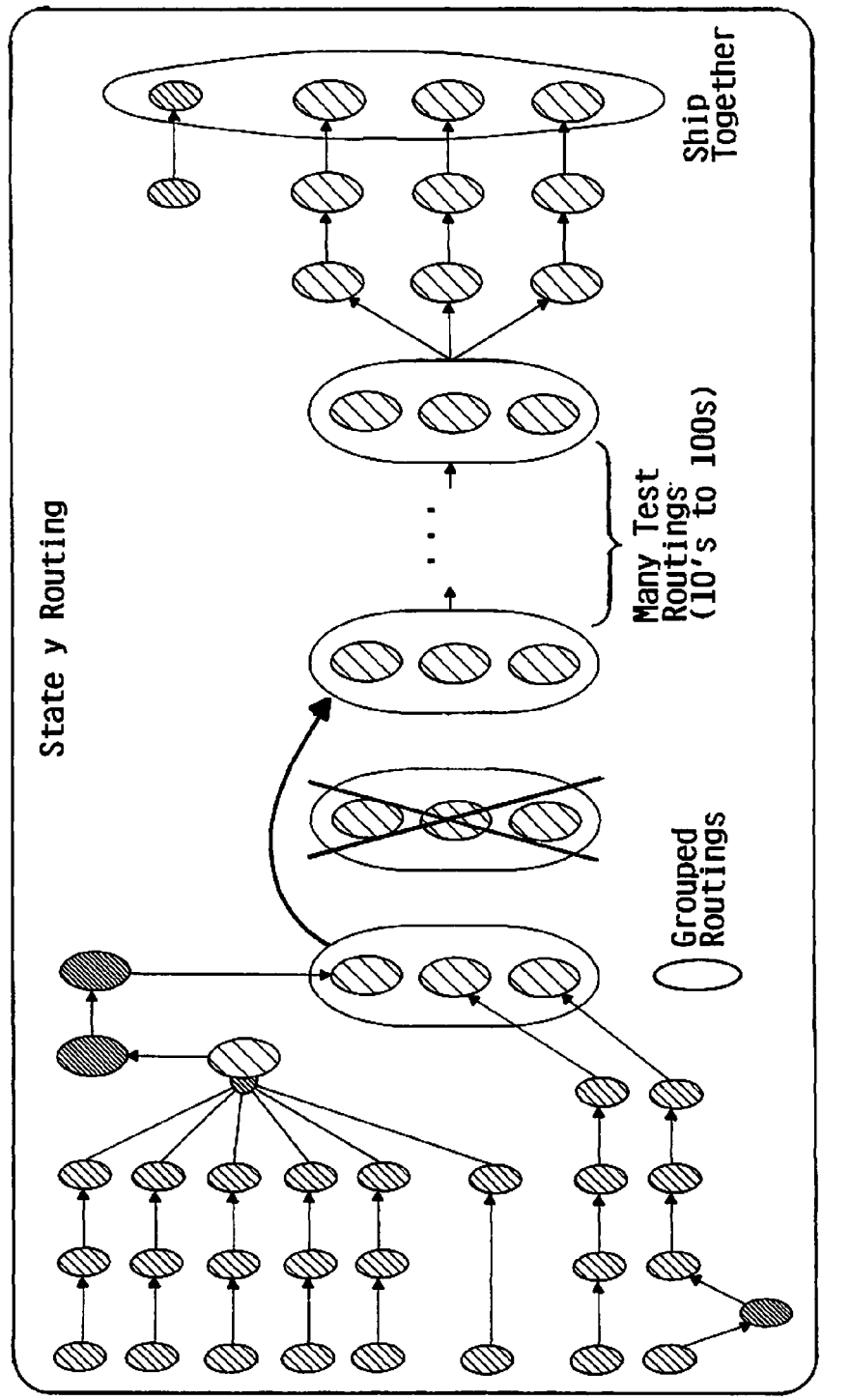
Figure 2C:
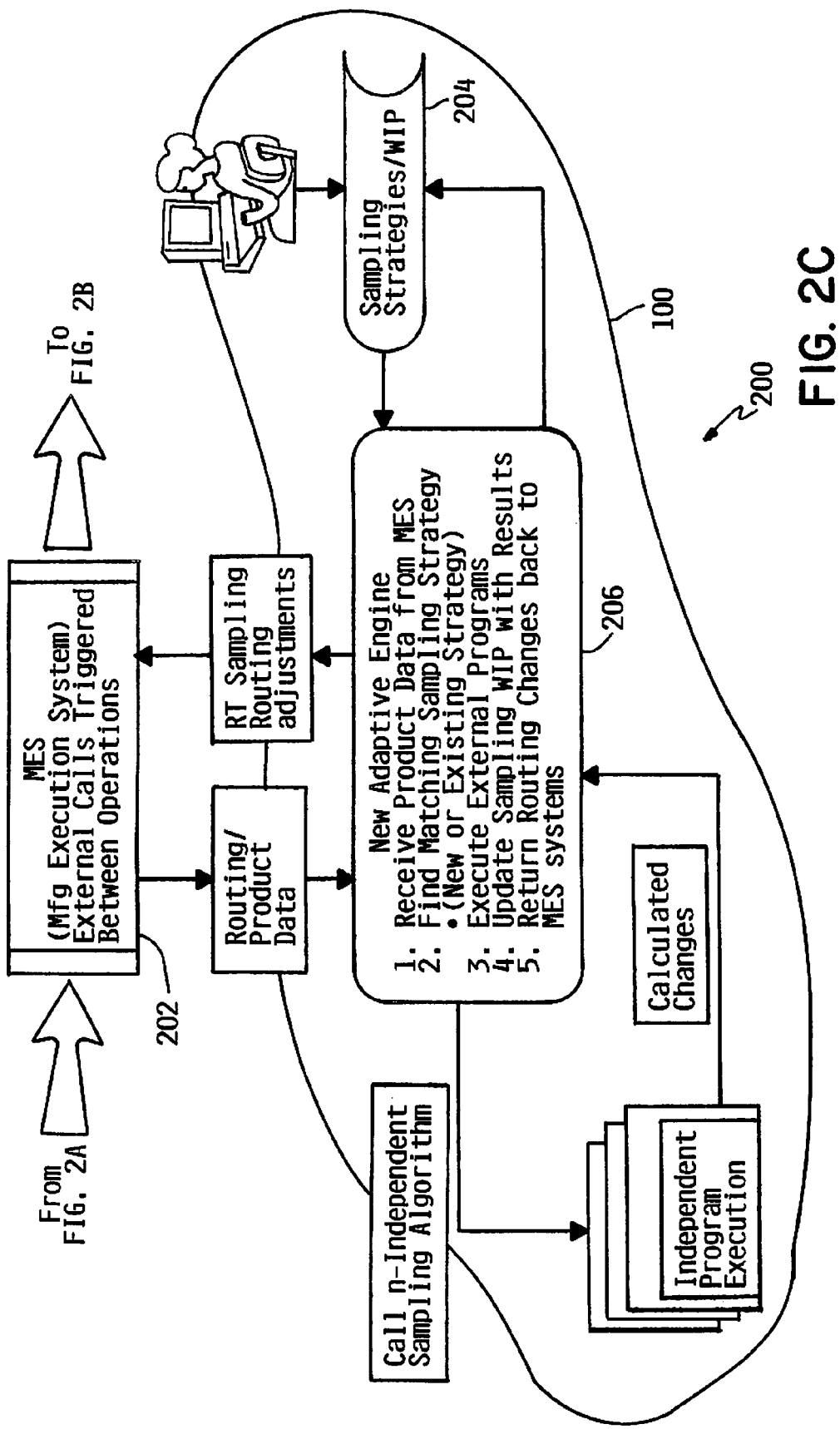

FIG. 2 provides a high-level overview 200 of one embodiment of the present invention in operation. At block 202, the MES 126 receives an external call from one of its managed stations 191, triggered by the completion of a process step, and then sends the current routing/product data for that assembly 190 to the adaptive engine 121. At block 204, the adaptive engine 121 reviews current sampling strategies for the assembly 122, along sampling history for that type of assembly 190. At block 206, the adaptive engine 121 resolves one or more sampling strategies assigned to the current assembly 190, and then generates an updated routing. In some embodiments, this will include using one or more of the external sampling programs 122. These programs 122, in turn, can resolve strategies defined against the assembly 190 as a whole and/or against its sub-assemblies, sub-sub-assemblies, etc. Control returns again at block 202, where the adaptive engine 121 will return the updated routing to the MES 126, which generates the corresponding work orders. In this way, the multiple sampling strategies can be set in motion for each assembly, and execution of these strategies is adapted in real time to respond to actual floor conditions.

Figure 3:
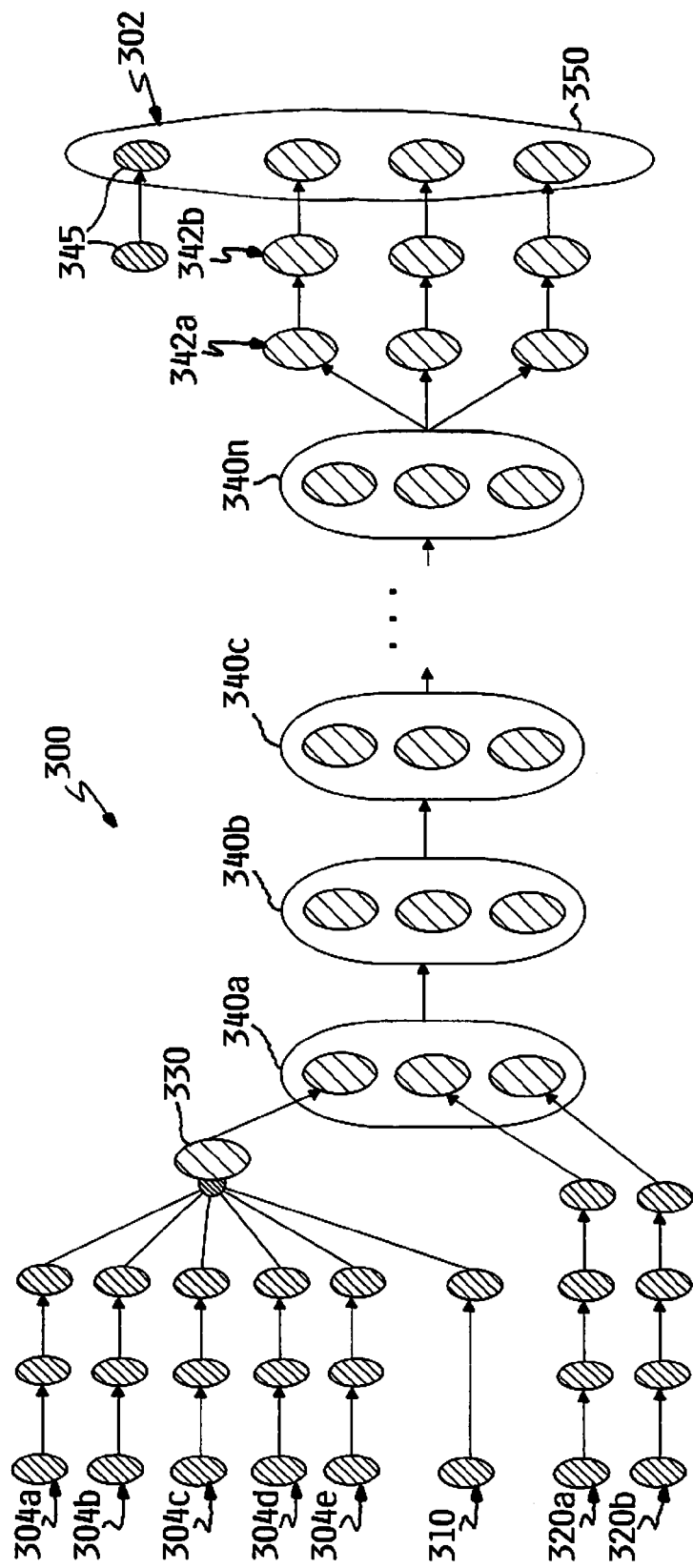
FIG. 3 is an original production routing for an example product.

FIGS. 3-6 further illustrate the adaptive engine 121 in operation. FIG. 3 shows the original production routing 300 for an example product 302, such as a server. The product 302 comprises a plurality of a first type of assembly 304a-304e, such as a drawer build; a second type of assembly 310, such as a controller; and a third type of assembly 320a-320b, such as a power supply unit. The first assemblies 304 in this example are merged into a higher assembly unit 330; which in turn is merged with the second assembly 310 and the third assembly 320 to form a routing group 340a-304n, such as a system level build unit. The routing groups 340, in turn, are processed through a series of system level manufacturing operations 342a-342n. The routing groups 340 are eventually combined with one or more accessories 345 to form a final customer shipment 350.

Figure 4:
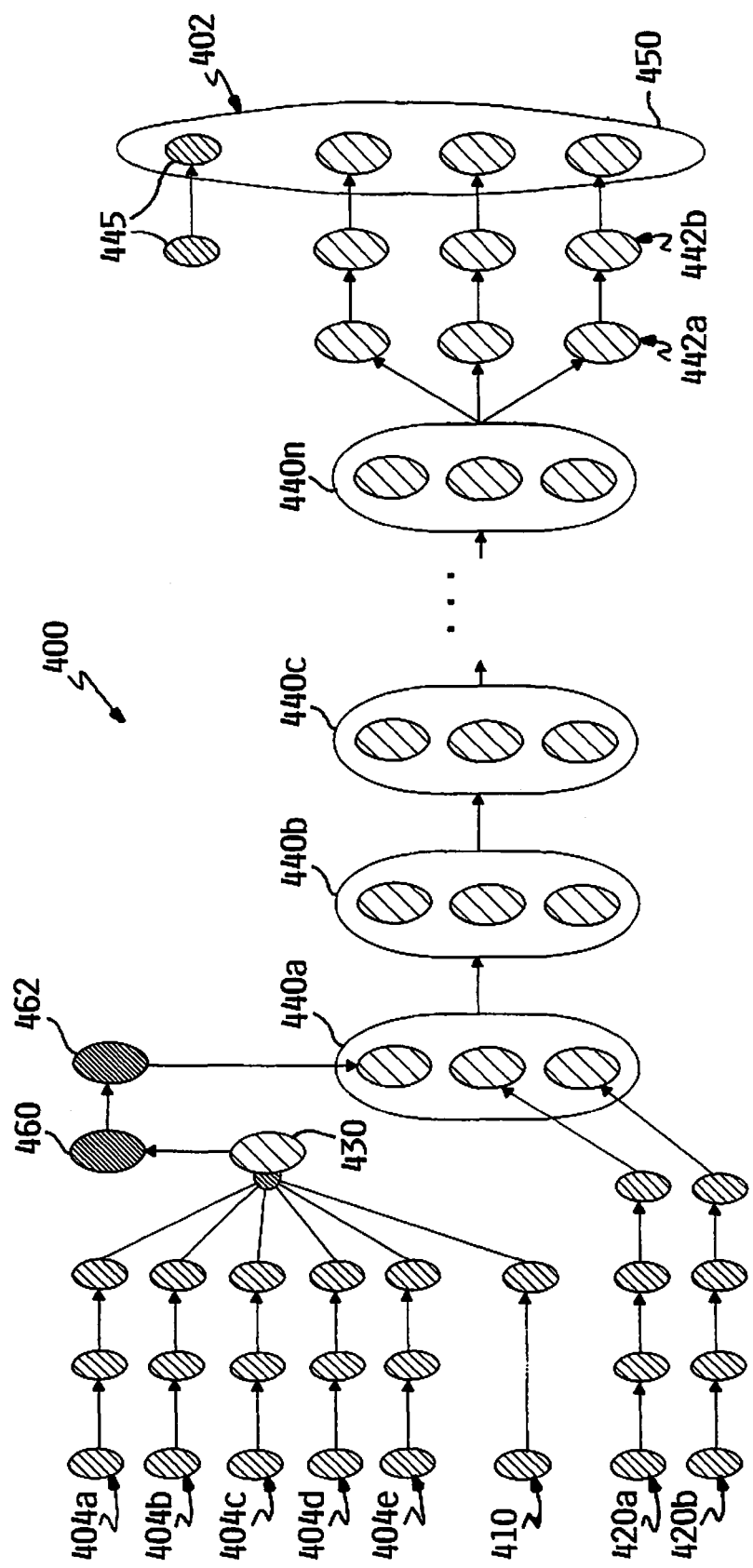
FIG. 4 illustrates a modified production routing for the example product, according to a "first off" sampling strategy.

FIG. 4 shows a modified production routing 400 for the example product 402, according to the "first off" sampling strategy 122a. As in FIG. 3, the product 402 comprises a plurality of a first type of assembly 404a-404e; a second type of assembly 410; and a third type of assembly 420a-420b. The first assemblies 404 in this example are merged into a higher level assembly 430; which in turn is merged with the second assembly 410 and the third assembly 420 to form a routing group 440a-440n. The routing groups 440, in turn, are processed through a series of system level manufacturing operations 442a-442n. The routing groups 440 are eventually combined with one or more accessories 445 to form a final customer shipment 450. Because the manufacturer has implemented the 'first off' sampling strategy 122a, however, the adaptive engine 121 dynamically adds operations 460 and 462 to the assembly 430, as this was the first time this particular "group" configuration was produced.

Figure 5:
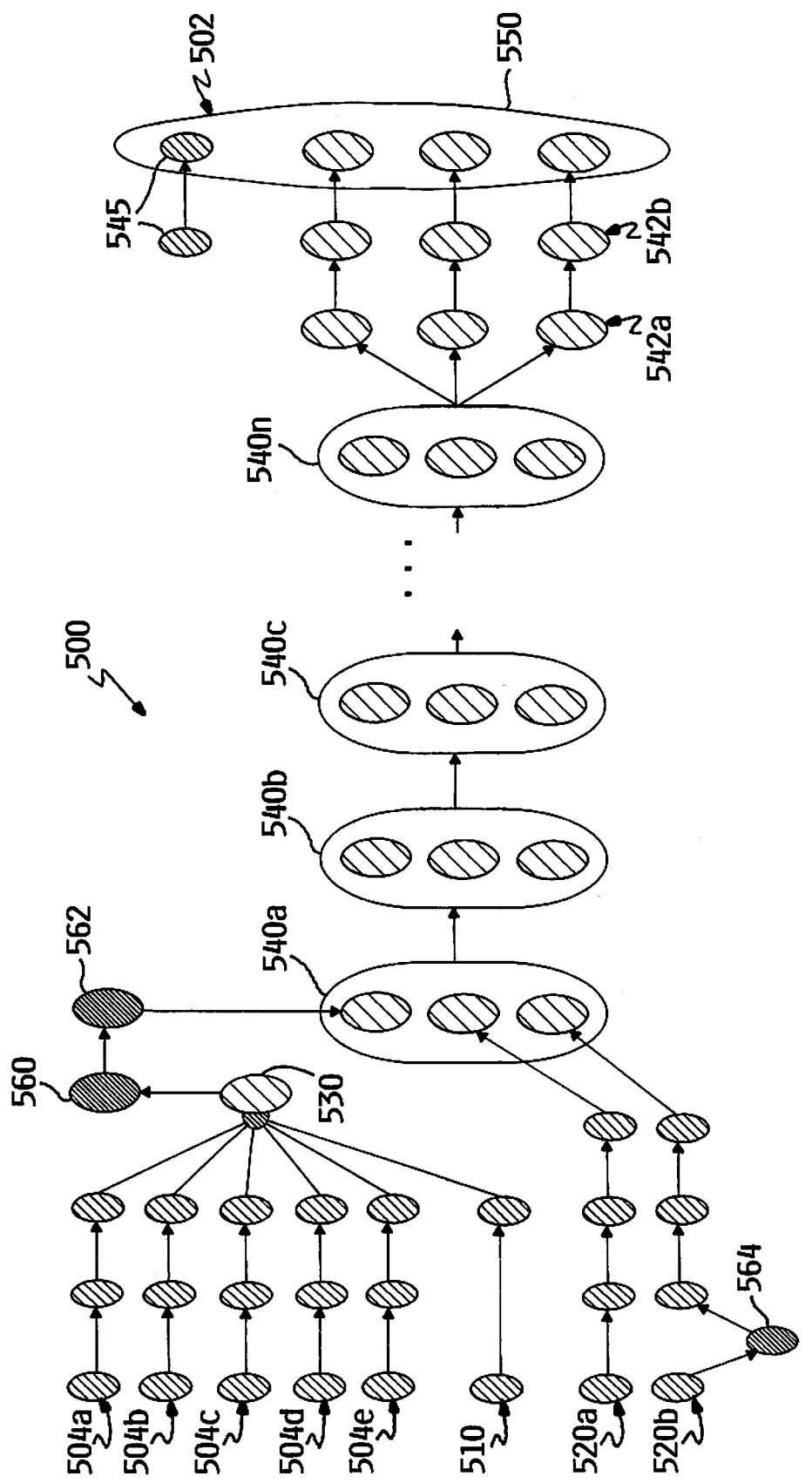
FIG. 5 illustrates a modified production routing for the example product, according to a 'percentage' sampling strategy.

FIG. 5 shows a modified production routing 500 for the example product 502, according to overlapping 'first off' strategy 122a and 'rate/qualify' sampling strategy 122b. As in FIG. 3, the product 502 comprises a plurality of a first type of assembly 504a-504e; a second type of assembly 510; and a third type of assembly 520a-520b. The first assemblies 504 in this example are merged into a higher level assembly 530; which in turn is merged with the second assembly 510 and the third assembly 520 to form a routing group 540a-540n. The routing groups 540, in turn, are processed through a series of system level manufacturing operations 342a-542n. The routing groups 540 are eventually combined with one or more accessories 545 to form a final customer shipment 550. Because the manufacturer has implemented both the 'first off' 122a and the 'rate/qualify' 122b sampling strategies, operation 564 was also dynamically added to unit of work 520b as that type of assembly hit desired sample rate.

Figure 6:
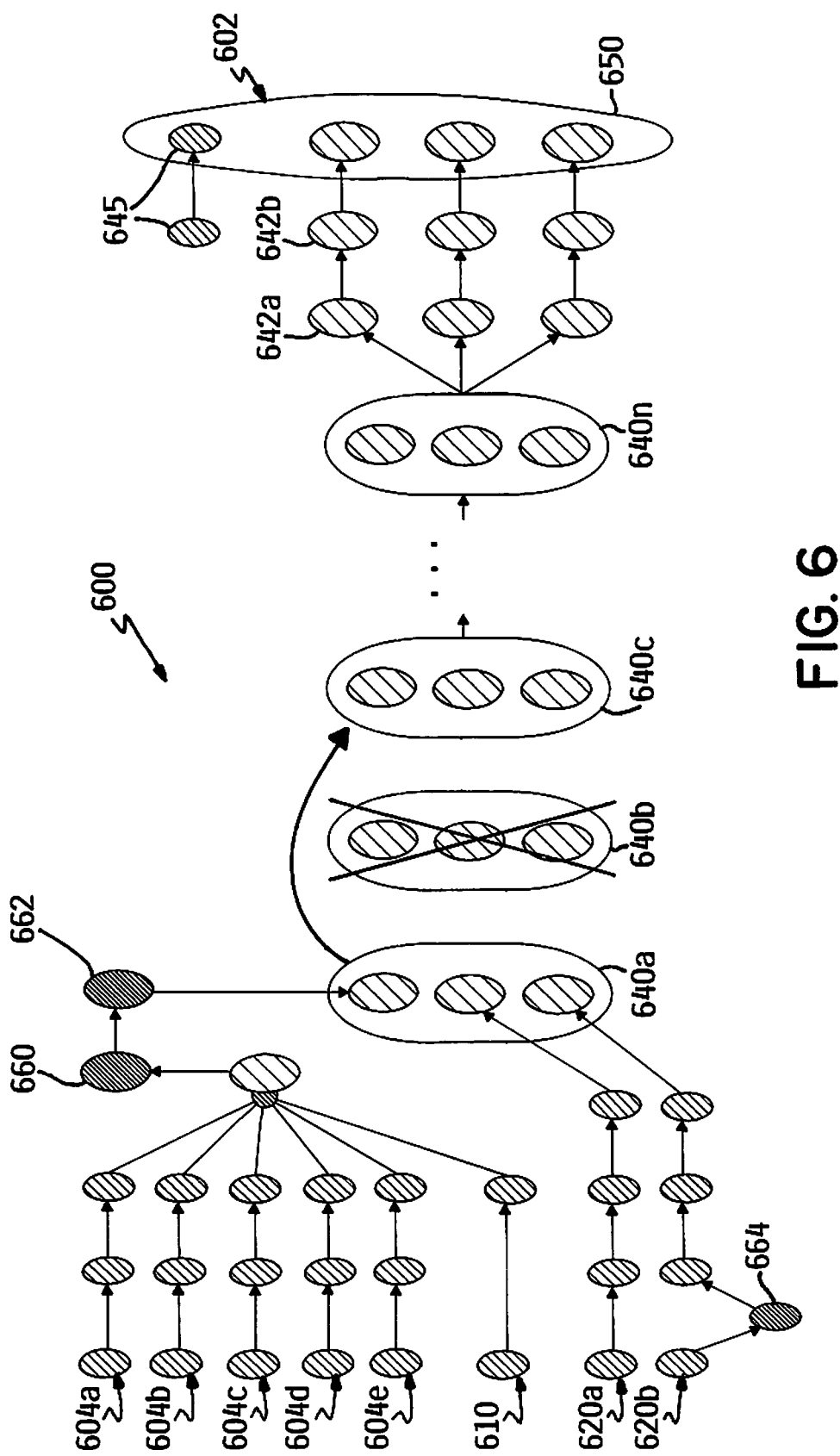
FIG. 6 illustrates a modified production routing for the example product, according to a 'special config' sampling strategy.

FIG. 6 shows a modified production routing 600 for the example product 602 added a 'special config' 122c sampling strategy to the 'first off' 122a and 'percentage' 122b strategies. As in FIG. 3, the product 602 comprises a plurality of a first type of assembly 604a-604e; a second type of assembly 610; and a third type of assembly 620a-620b. The first assemblies 604 in this example are merged into a higher level assembly 630; which in turn is merged with the second assembly 610 and the third assembly 620 to form a routing group 640a-640n. The routing groups 640, in turn, are processed through a series of system level manufacturing operations 642a-642n. The routing groups 640 are eventually combined with one or more accessories 645 to form a final customer shipment 650. Because the manufacturer has also added the 'special config' 122c sampling strategy, however, a system level operation 640b was dynamically removed due to the presence of the triggering special configuration.

Figure 7A:
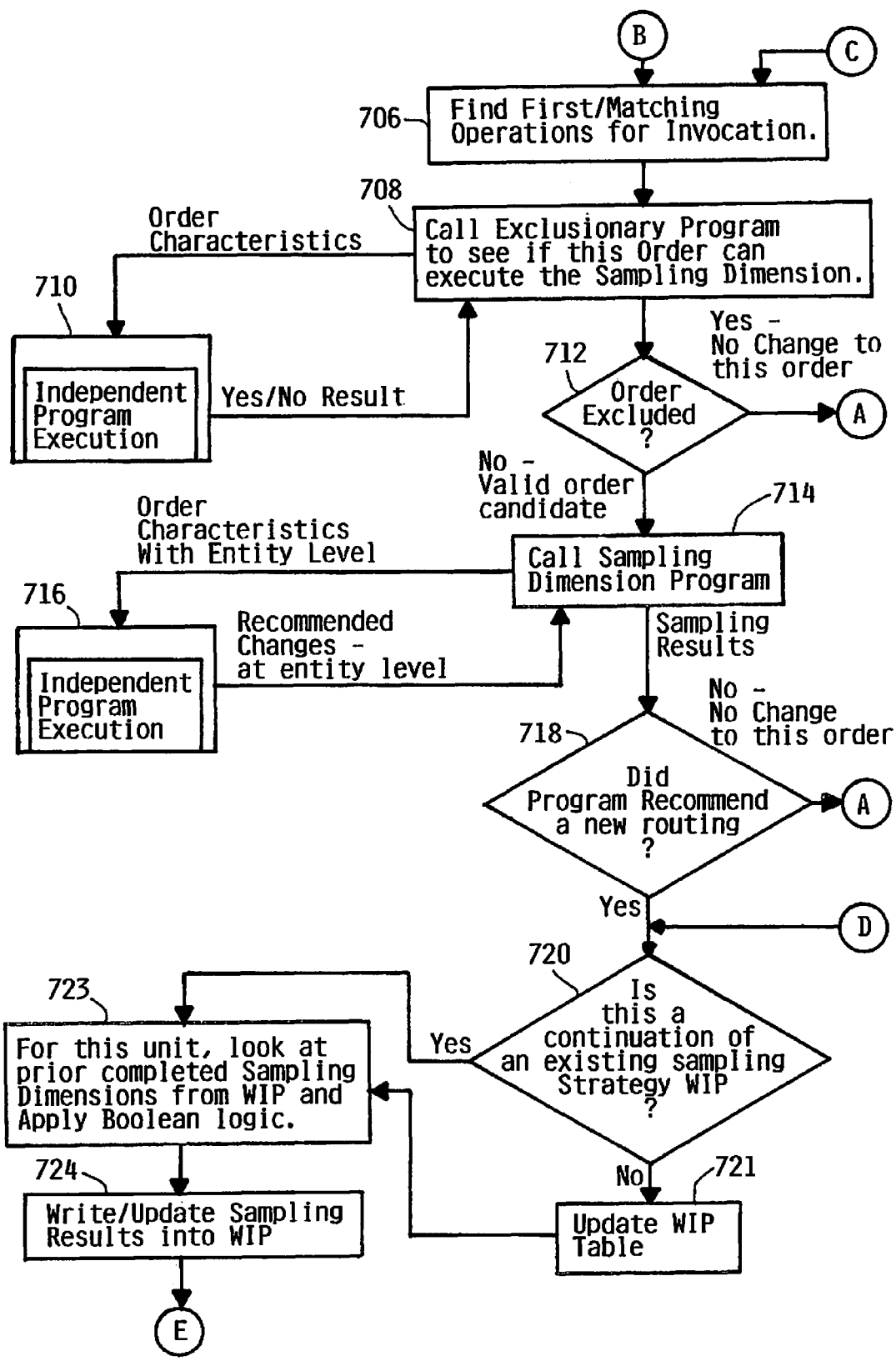
FIG. 7 illustrates the operation of one adaptive engine embodiment.
Figure 7B:
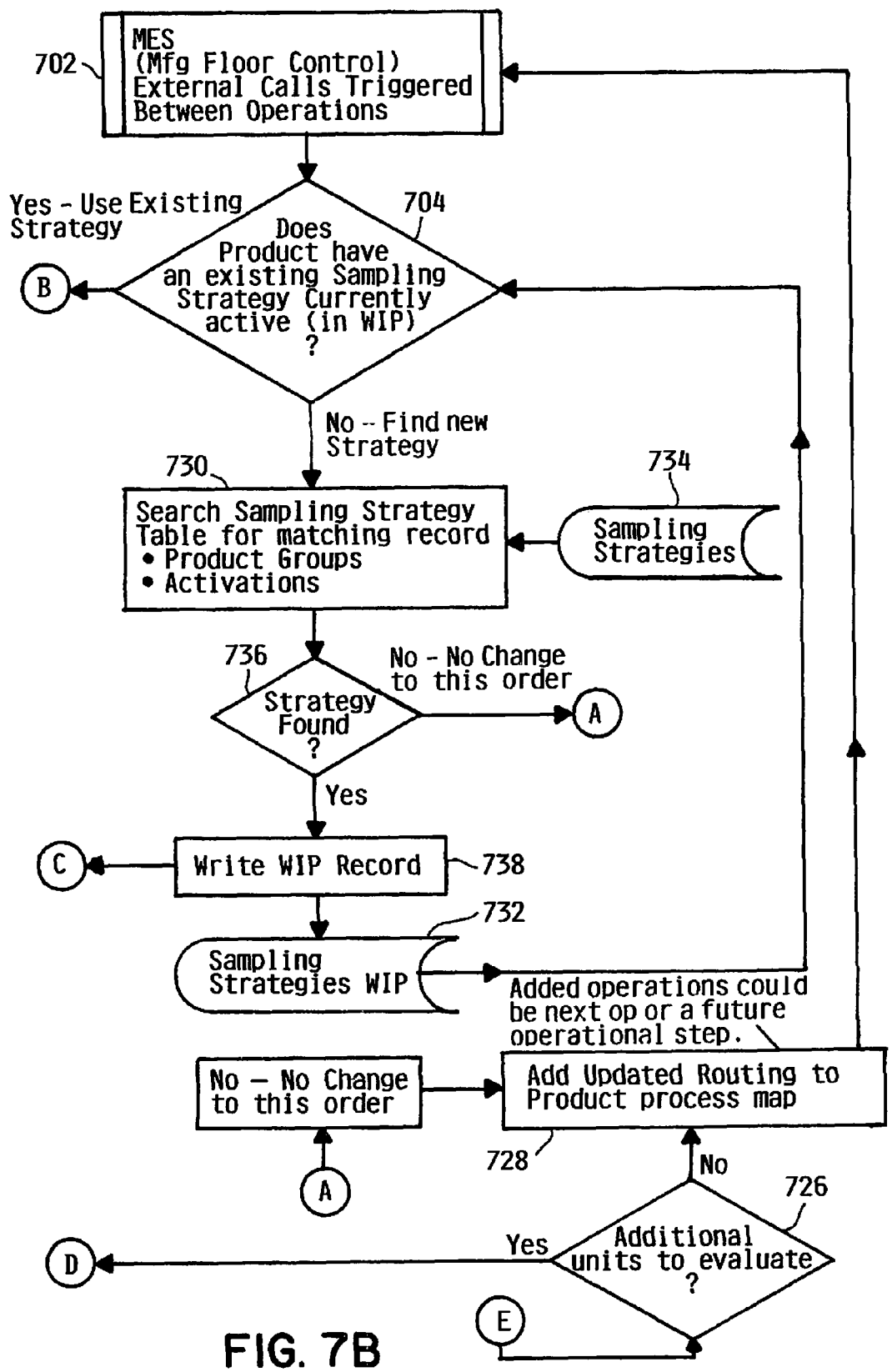

FIG. 7 illustrates the operation of one adaptive engine embodiment 121 in more detail. At block 702, the adaptive engine 121 receives an external call from one of the various systems 191 under its control. These calls occur each time an assembly 190 has reached a defined operation 174 in its manufacturing flow. At block 704, the adaptive engine 121 determines if the assembly 190 has an existing 'currently active sampling plan' (not shown) in the work in progress (WIP) database 128.

If the adaptive engine 121 determined at block 704 that the product does not have an existing sampling plan, the adaptive engine 121 first searches the sampling strategy table 180 for matching record product groups 171 and activation criteria 173 at blocks 730-734. That is, the manufacturing entity in this embodiment has defined various process steps and tests it wants to occur. The adaptive engine 121 searches the sampling strategy table 180 to determine if a matching strategy exists. If the adaptive engine 121 finds a matching strategy, the adaptive engine 121 will start a new WIP record 182 in the WIP database 128 at block 738 and update the strategies WIP table 170 at block 732. This initiates the record in the WIP table that future processing will update.

If the adaptive engine 121 determined at block 704 that an active sampling plan exists or if the adaptive engine 121 created a new active sampling plan at blocks 730-738, the adaptive engine 121 then begins to apply the strategy at blocks 706-724. More specifically, starting at block 706, the adaptive engine 121 searches the WIP record 170 for operations 174 that match the triggering event (block 702). The adaptive engine 121 then reviews the corresponding sampling exclusion criteria 175 at blocks 708-712 to determine if there are any systematic reasons why the action should not occur (e.g., the test station is unavailable, the action occurs too near a critical deadline). In some embodiments, this may be as simple as reviewing the WIP database records 180 for the corresponding criteria 175. In other embodiments, these blocks may include calling one of the sampling strategy programs 122 at block 710 to resolve more complex set of circumstances. If the action is excluded by the exclusion criteria, the adaptive engine 121 records this fact in the WIP database record 182 for the assembly 190 and then returns the next process step at block 728 in response to the original external call (block 702).

If the action was not excluded at blocks 708-712, the adaptive engine 121 then calls one or more of the sampling dimension programs 122 at blocks 714-718 to determine if any actions need to be added to or deleted from the manufacturing routing for this particular product. These one or more sampling programs 122 include the FOT 122a, RATE 122b, and special config 122c programs described with reference to FIGS. 3-6.

If the sampling dimension programs 122 did not recommend a change to the routing (block 718), the sampling dimension program adds the 'updated' routing to the routing map at block 728, where the update will indicate no changes were required. However, if the sampling dimension programs 122 did recommend a change to the routing (block 718), then the adaptive engine 121 begins to iterate through each unit under evaluation at blocks 720-726. More specifically, at block 720, the adaptive engine 121 first determines whether, for the current unit, this is a continuation of an existing sampling strategy. If so, then the sampling proceeds directly to block 723; otherwise, the adaptive engine 121 updates the WIP table at block 721 and then proceeds to block 724.

At block 724, the adaptive engine 121 reviews the conditions field 176 and the recommended sampling dimensions (blocks 714-718), resolves the conditional logic, and then calculates routing change orders. These routing change orders, in turn, determine if/when various operations occur in view of past sample selection, execution, and/or results. For example, in one embodiment, the conditions field 176 may contain an "*ALL" condition or an "*OPT" condition. The "*ALL" condition indicates the corresponding operation should be executed if the sampling dimension program returns a routing change. The "*OPT" condition indicates that the corresponding operation should execute only if the calling sampling dimension returns a routing change and any of the previous conditions have not been met for the manufacturing entity. Table 1 provides the resolution of how the conditional Boolean logic resolves in some example circumstances.

TABLE 1

| Conditions | Sampling Dimension | Mfg. Entity Level | Interpretation of Conditional Logic |
| --- | --- | --- | --- |
| *ALL | 1. FOT | 1. WU | 1. If the FOT program recommends a routing change, then *ALL means VALID |
| *OPT | 2. PART | 2. WU | 2. If the PART program recommends a routing change and FOT (1) was also VALID, then *OPT means that this operation is skipped for this mfg. entity. IF FOT (1) was INVALID and if PART recommends a routing change, then *OPT means VALID |
| *ALL | 3. FOT | 3. MFGN | 3. IF FOT for different ENTITY level recommends routing change, then *ALL means VALID |
| *OPT | 4. RATE | 4. MFGN | 4. If RATE recommends routing change and none of the previous (FOT (1), RATE (2), FOT (2)) were VALID, then *OPT means VALID. If any of (FOT (1), RATE (2), FOT (2)) were VALID, then OPT means operation is skipped. |

As shown, the "*OPT" condition is particularly desirable because it helps distribute the global sampling plan across the total production run. That is, the "*OPT" condition prevents one particular assembly 190 from being sampled repeatedly, thus throwing off the overall validity of the testing program. The "*OPT" condition can also help avoid bottlenecks by allowing inspection operations to be deferred during particularly busy times or in response to shortages and/or outages.

Figure 8A:
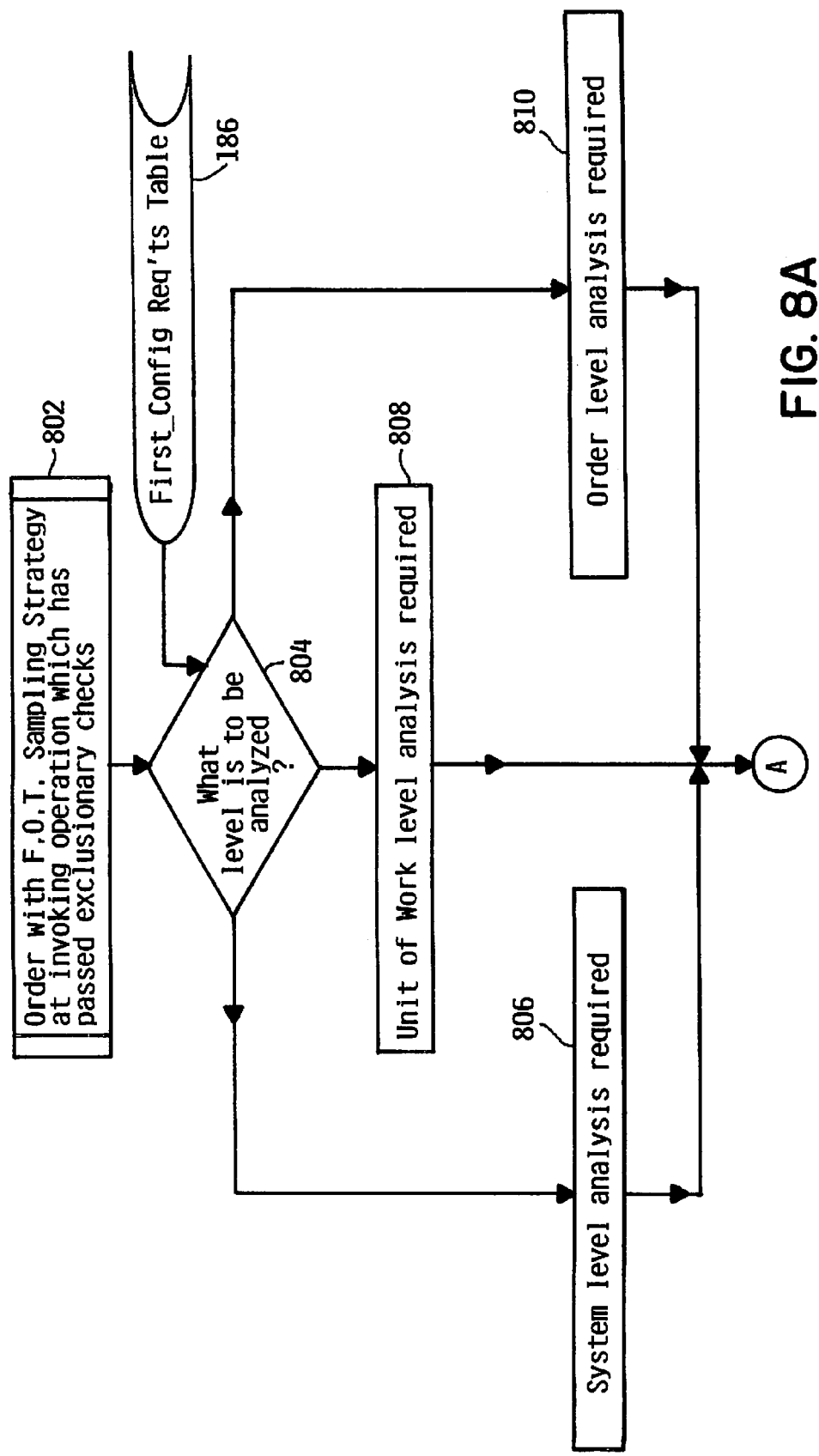
FIG. 8 illustrates one embodiment of the first off sampling ("FOT") sampling program in more detail.
Figure 8B:
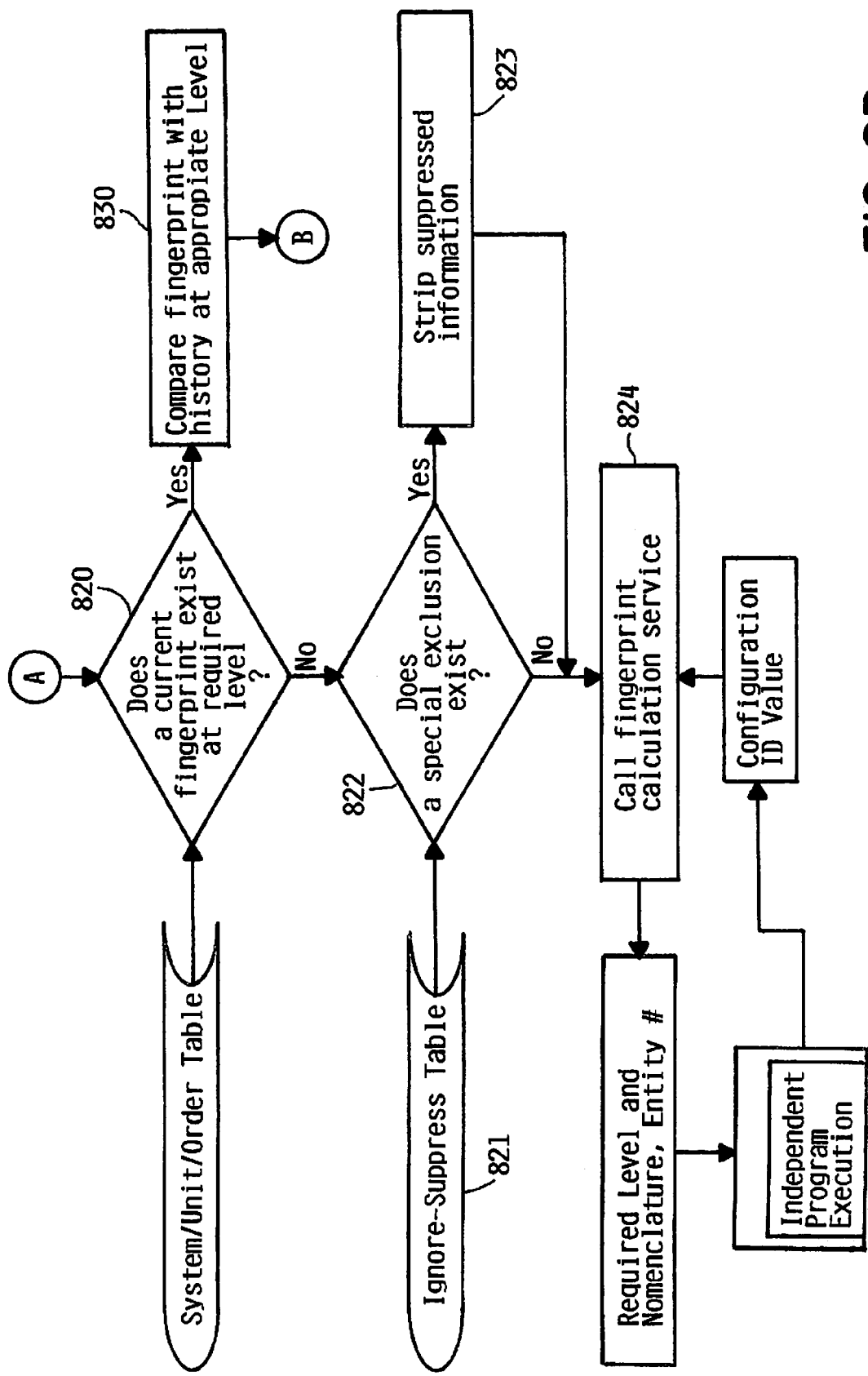
Figure 8C:
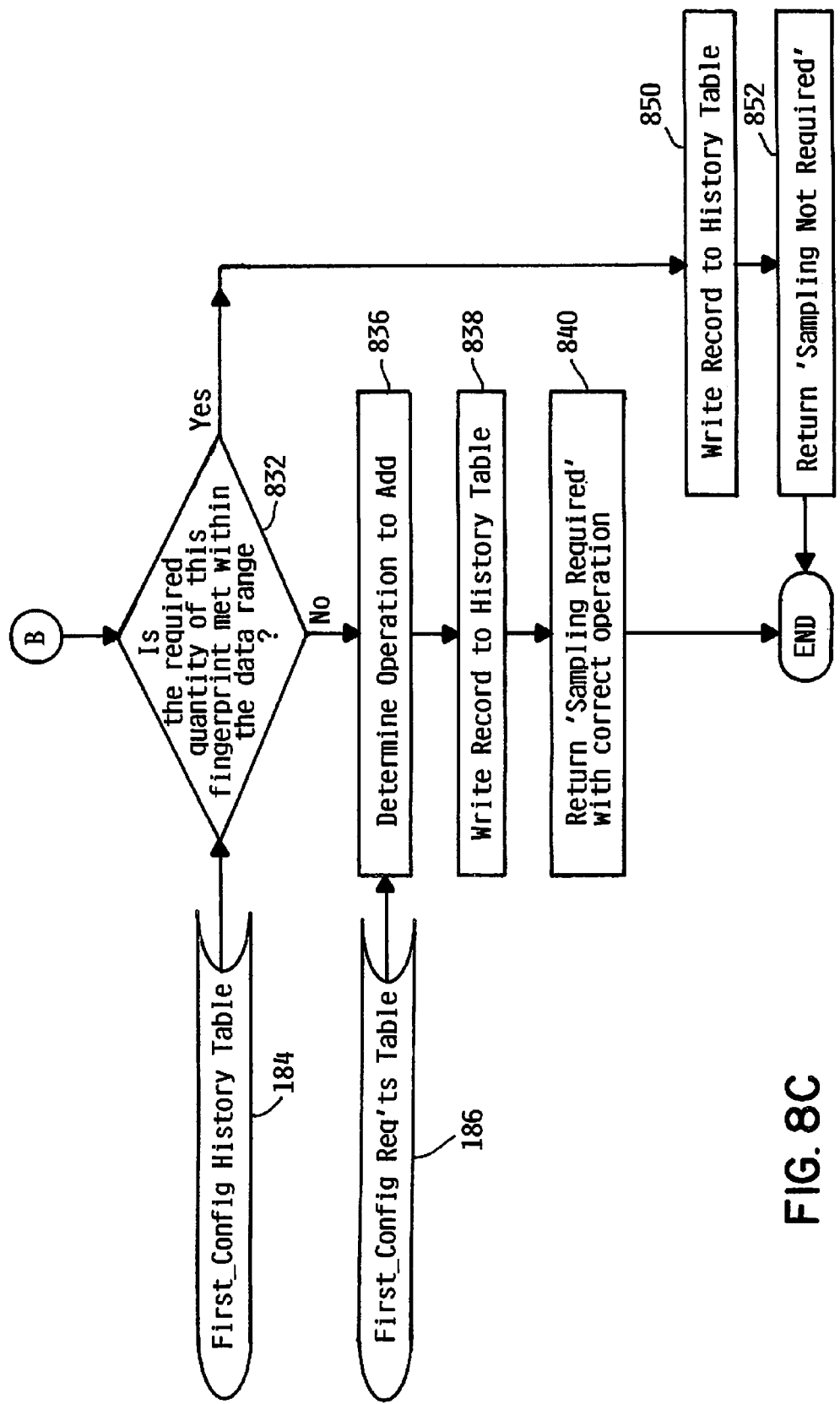

FIG. 8 illustrates one embodiment of the first off sampling ("FOT") sampling program 122a in more detail. In operation, each order is processed by a fingerprint service 123 that coverts the specific list of machine type model numbers (MTMs, sometimes known as product numbers or SKUs), feature codes, and quantities into a fingerprint. The resulting fingerprint is then checked against a database of previously built products and, if fingerprint not found, the order is assigned the required additional operation(s) and the table is updated. If, however, the fingerprint is found, then the system's 100 current date is compared against an 'expiration' criterion. If the previous instance was too old, then the current order is also scheduled for inspection.

Figure 10:
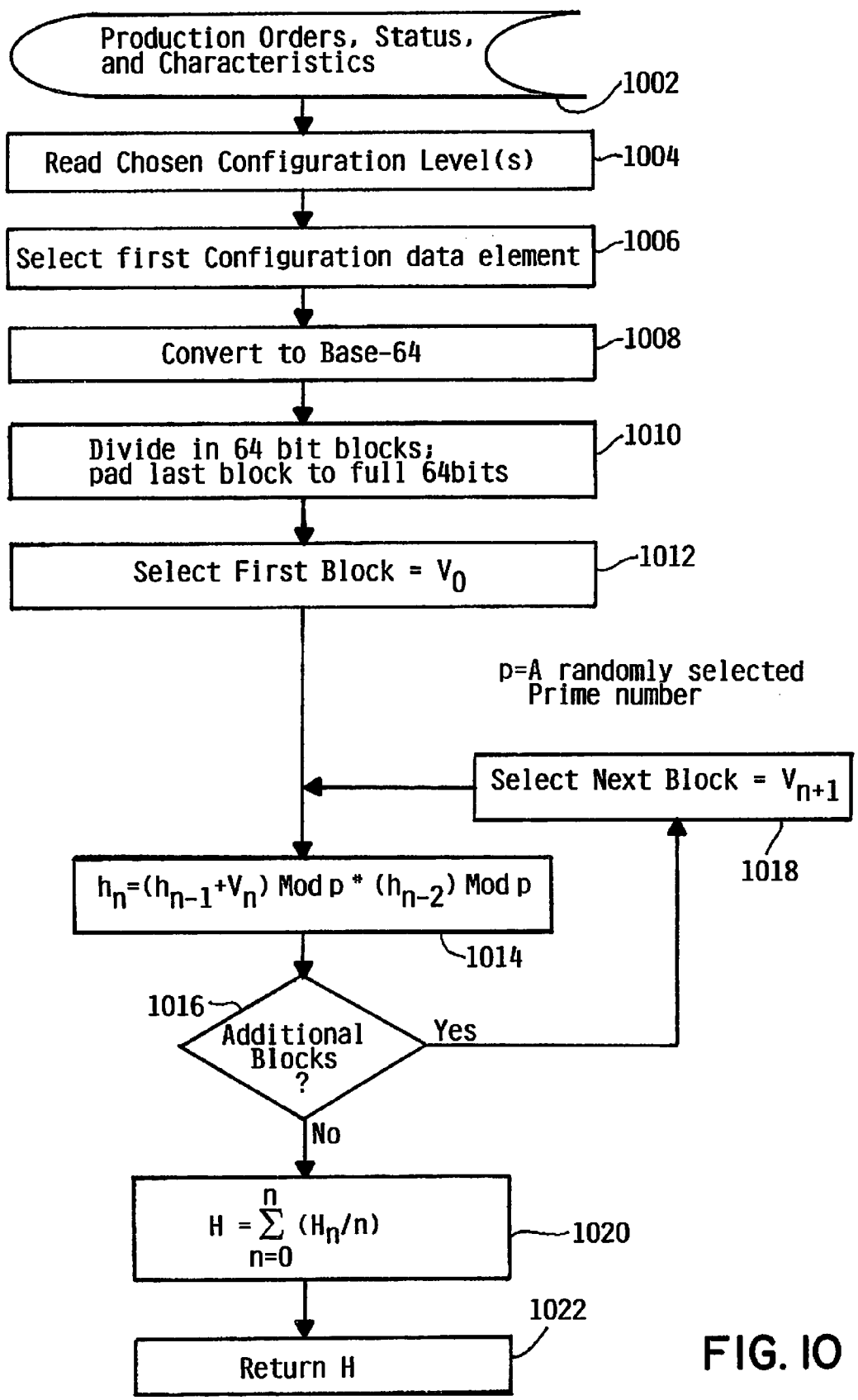
FIG. 10 illustrates how to calculate a fingerprint in more detail.

More specifically, at block 802, the FOT sampling program 122a receives order information from the adaptive engine 121 indicating that the organization wants "FOT" sampling and indicating that the order passed all of the exclusionary checks (described with reference to blocks 708-712 in FIG. 7). Next, the FOT program 122a determines at blocks 804-810 what product level the order involves, e.g., system level analysis 806, unit of work level analysis 808, or order level analysis 810. This operation may involve reviewing the first_config requirements table 186 (FIG. 10). At block 820, the FOT program 122a then determines whether the assembly 190 already has an appropriate level fingerprint in the WIP database 128. If not, the FOT program 122a first if checks an ignore/suppress table 821 to determine if any portions of the configuration can be ignored when calculating the fingerprint at blocks 822-823, then calls the fingerprint service 123 at block 824 to calculate the fingerprint using the required level, nomenclature, and entity number.

At block 830, the FOT program 122a compares the fingerprint for the current assembly 190 to the first_config history table 184 (FIG. 10) in the WIP database 128. The sampling dimension program 130 then determines at block 832 if the required sampling quantity for this fingerprint has been met within the date range. Part of this operation includes querying the first_config history table 184. If additional sampling is required, the FOT program 122a determines which operations to add at block 836, again using the first_config requirements table 186. The FOT program 122a concludes by updating the WIP records at block 838 and then returning a "sampling required" response, together with the correct operation(s), to the MES 126 at block 840.

If, however, the FOT program 122a determined at block 832 that the required quantity of this config ID has already been met within the date range, the FOT program 122a writes this result to the first_config history table 184 at block 850 and then returns a "sampling not required" response to the MES 126 at block 852.

Figure 9:
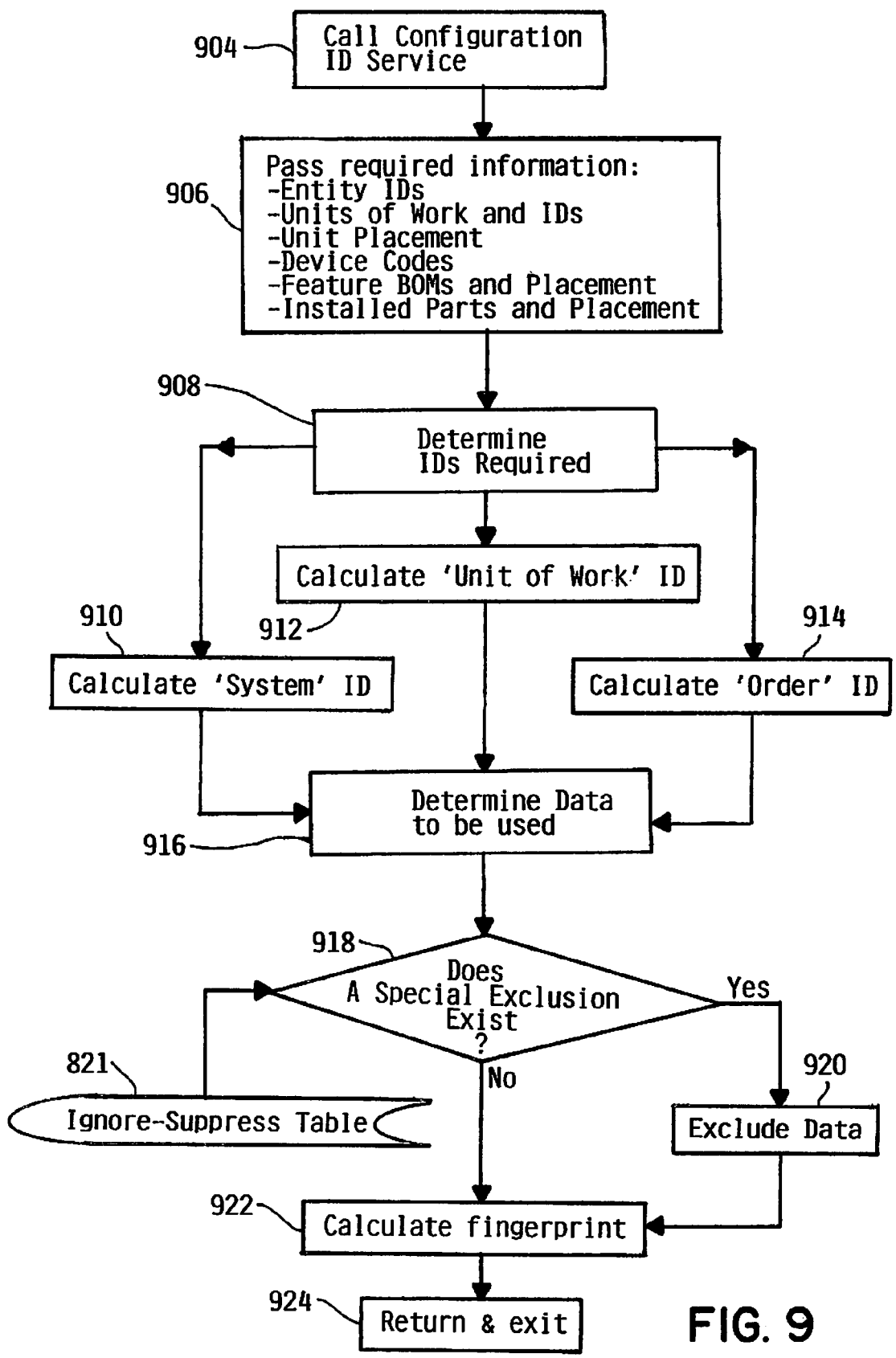
FIG. 9 illustrates one embodiment of a fingerprint ID service.

FIG. 9 illustrates one embodiment of the fingerprint ID service 123. At block 904, the fingerprint ID service 123 receives an order (block 902a-902c) from the adaptive engine 121 requesting a new or updated fingerprint. At block 906, the fingerprint ID service 123 parses the order to obtain the information that will be required to form the fingerprint, such as the entity ID, the units of work and their IDs, the unit placement, the device codes, feature bills of materials (BOM) and placement, and installed parts and placement. At blocks 908-914, the fingerprint ID service 123 parses the order to determine what type of fingerprint is responsive to the original request.

The fingerprint ID service then gathers the information necessary to calculate the fingerprint at block 916. In some embodiments, this may include querying an ignore-suppress table at blocks 918-920 to determine if any portions of the order should be ignored for this assembly. That is, if a 'system' fingerprint normally is normally generated from items A, B, C, and D, the ignore-suppress table may indicate that the fingerprint ID service should skip item B for this particular assembly 190. The fingerprint ID service 123 then calculates the requested fingerprint type at block 922 and returns the result at block 924.

FIG. 10 illustrates how to calculate the fingerprint in more detail. At block 1002, the fingerprint ID service 123 receives an order from the adaptive engine 121 requesting a new or updated fingerprint. The fingerprint ID service 123 may also search the WIP database 128 to obtain the information that will be required to form the fingerprint, such as the entity ID, the units of work and their IDs, the unit placement, the device codes, feature bills of materials (BOM) and placement, and installed parts and placement. The fingerprint ID service 123 parses the request for the desired configuration level(s) at block 1004 and then selects the first configuration data element at block 1006. Next, the fingerprint ID service 123 converts the configuration data element(s) into base-64 at block 1008 and then divides that result into 64 bit blocks at block 1010. Some embodiments will pad the last block to ensure it has the full 64 bits. Next, at blocks 1012-1020, the fingerprint ID service 123 will then compute a hash from the 64 bit blocks. Although the particular hash in described in FIG. 10 is desirable because it produces similar outputs for similar inputs, any known check-sum, message digest, or hashing algorithm that produces a unique result may be used. The resulting hash is returned at block 1022 as the fingerprint.

Figure 11A:
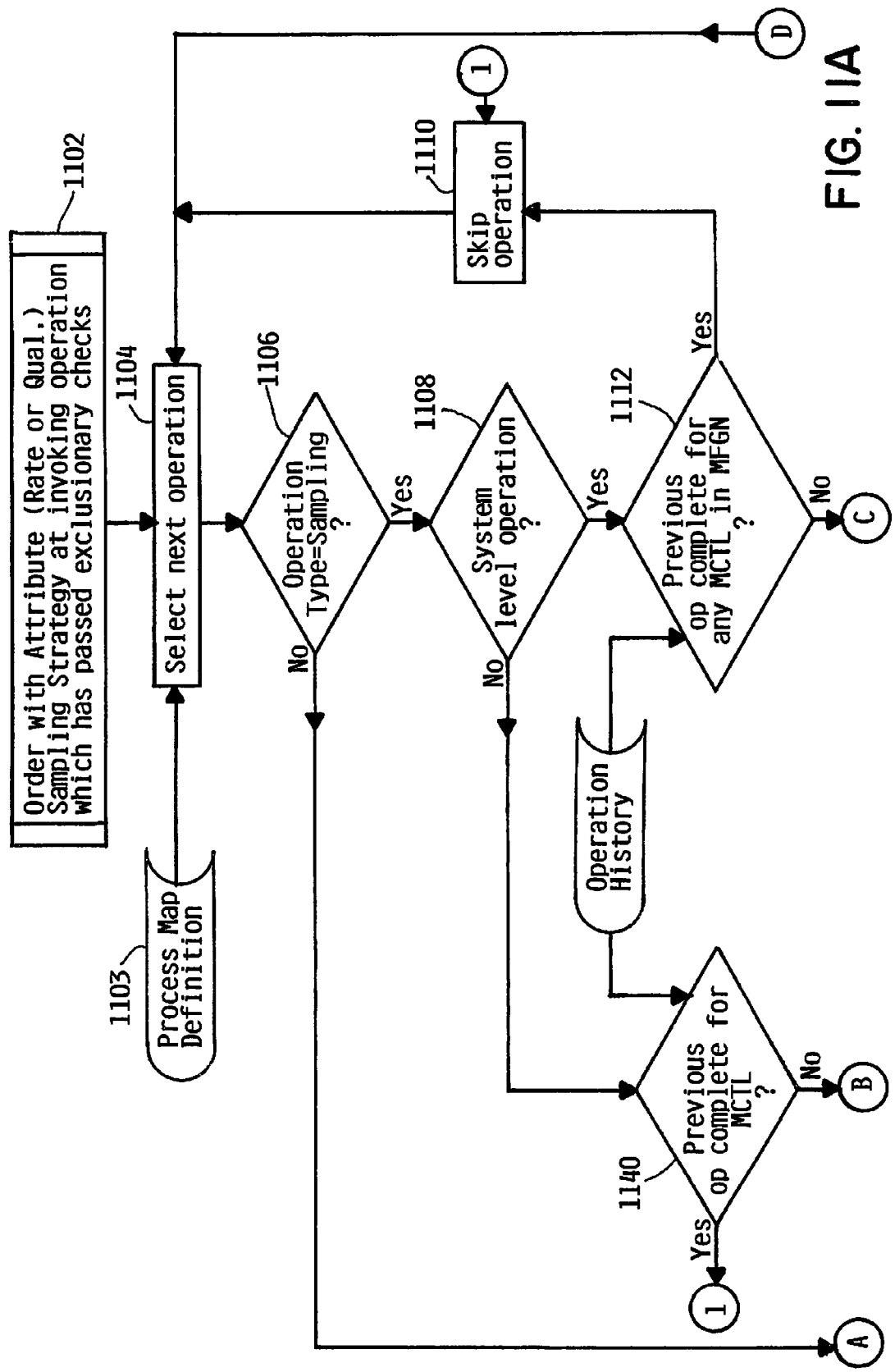
FIGS. 11-12 illustrate the operation of the rate qualify based sampling strategy program in more detail.
Figure 11B:
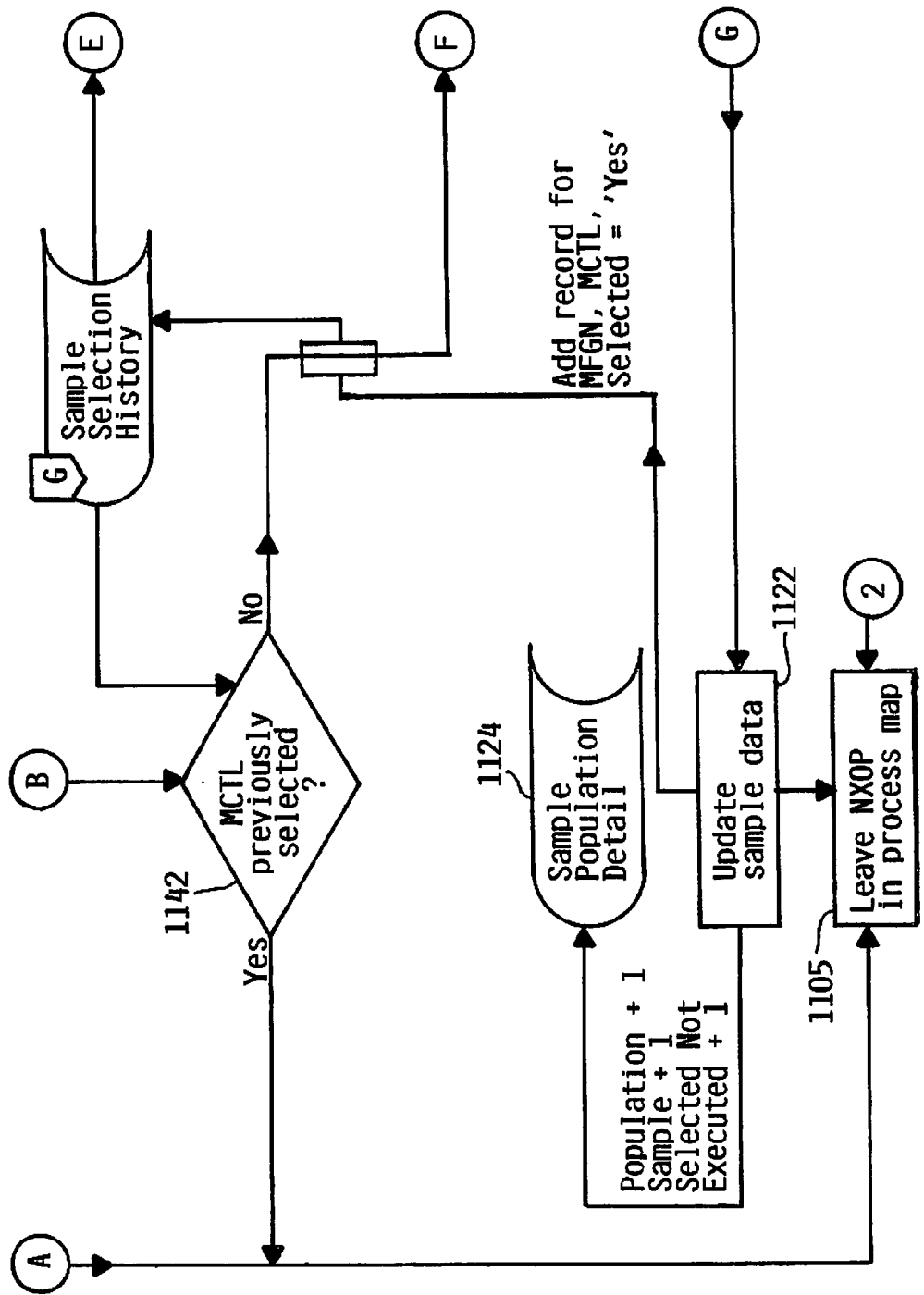
Figure 11C:
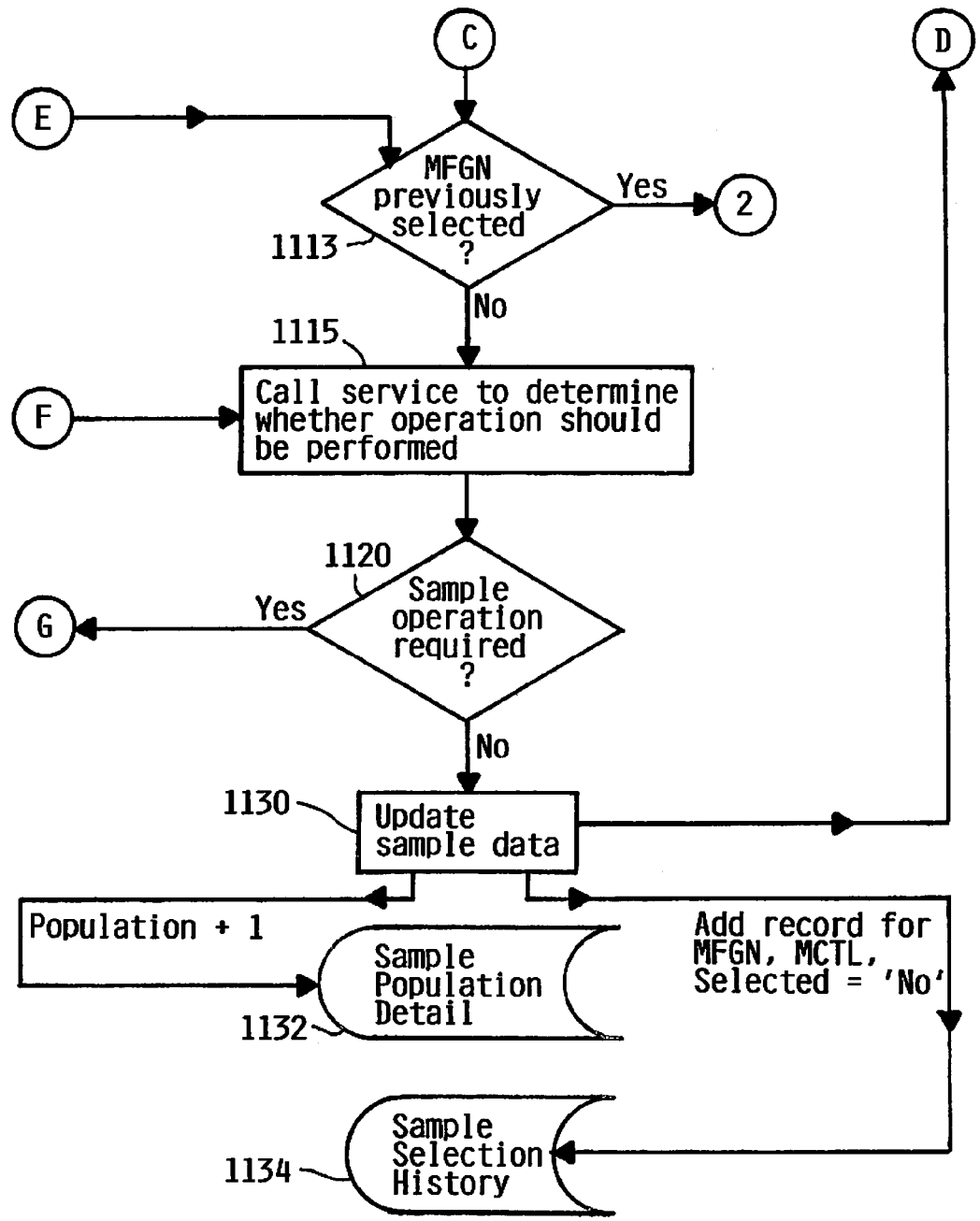

FIG. 11 illustrates the operation of the rate qualify based sampling strategy program 122b in more detail. In operation, this program 122b tracks for which systems or units of work a sampling operation is selected, and the corresponding attribute list is used to determine whether or not to sample this particular item. More specifically, at block 1102, the RATE program 122b receives a call asking it to evaluate the sampling strategy for an assembly 190. The RATE program 122b responds by first reviewing a routing map definition file for the next operation (i.e., the operation after the one that triggered the call) at blocks 1103-1104. Next, at block 1106, the RATE program 122b determines if the next operation is a sampling operation. If not, it leaves the next operation in the routing map at block 1105 and exits; otherwise, the RATE program 122b proceeds to block 1108.

At block 1108, the RATE program 122b determines if the next operation is a system level operation. If so, the RATE program 122b then asks whether the previous operation completed the sampling strategy for any lower level assembly 190 (e.g., assembly 190b in MFGN 190a) at block 1112. If yes, then the RATE program 122b skips the next operation at block 1110 to avoid dirty data in the population and then returns to block 1102; otherwise, the RATE program 122b determines at block 1113 if the highest level for this assembly 190 had been previously selected. If no, then the RATE program 122b determines whether a sampling operation should be performed at block 1115 (described in more detail with reference to FIG. 12), otherwise, if RATE program 122b determined the highest level for this assembly 190 had been previously selected at block 1113, the RATE program proceeds to block 1105.

At block 1120, if an additional sampling operation was required by block 1115, then the RATE program 122b issues work orders requesting the tests be performed at block 1122, updates the sample population data at block 1124, and then proceed to block 1105. If, however, an additional sampling operation was not required at block 1120, then the RATE program 122b proceeds to update the WIP database 128 with the new sample data at block 1130 and update the sample population data at block 1132 and block 1134. That is, the RATE program 122b logs that there was an assembly 190 that met the population requirements, or the RATE program 122b logs the number sampled and indicates that the assembly 190 is marked but not yet complete. When the sampling completes, then the assembly 190 is updated again to reflect that fact. These two pieces of data are desirable to show how many were assemblies 190 were actually sampled and how many assemblies 190 were produced in total. Thus, using this information, the RATE program 122b can access the percentage sampled already, etc.

At block 1140, if the RATE program 122b determined at block 1108 that this was not a system level operation, then the RATE program 122b determines whether the previous operation was the last defined for the sub-assembly 190b, 190c, etc. This decision may include querying the manufacturing history for the sub-assembly 190b, 190c, etc. If previous operation did complete the sub-assembly 190b, 190c, etc, then the RATE program 122b determines at block 1142 whether the sub-assembly 190b, 190c, etc. was previously selected; otherwise the RATE program 122b proceeds to block 1110.

If the sampling strategy determined at block 1142 that sub-assembly 190b, 190c, etc. was previously selected, then the RATE program 122b proceeds to block 1105, otherwise the RATE program 122b proceeds to block 1115 and resolves the sub-assembly 190b, 190c, etc.

Figure 12A:
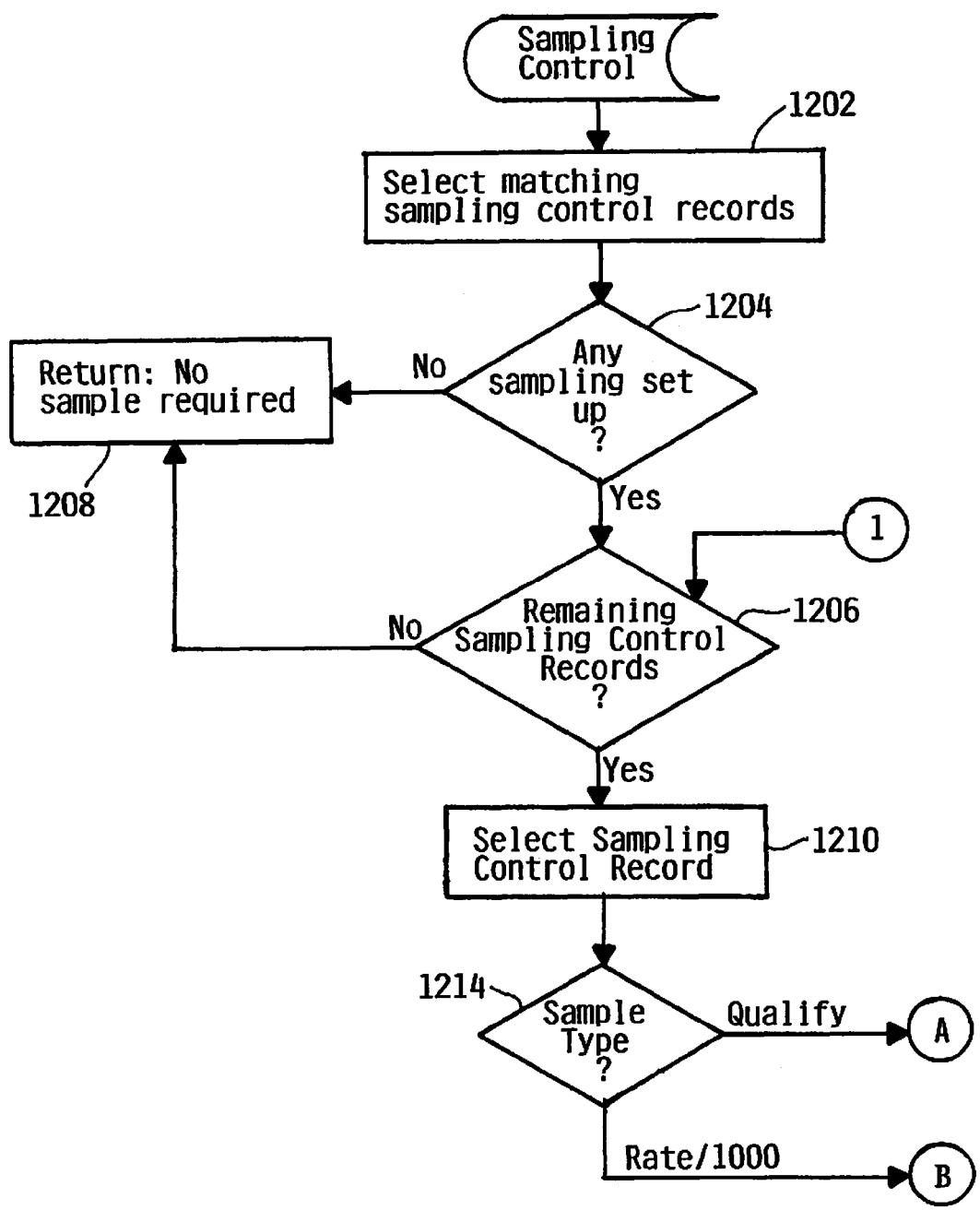
Figure 12B:
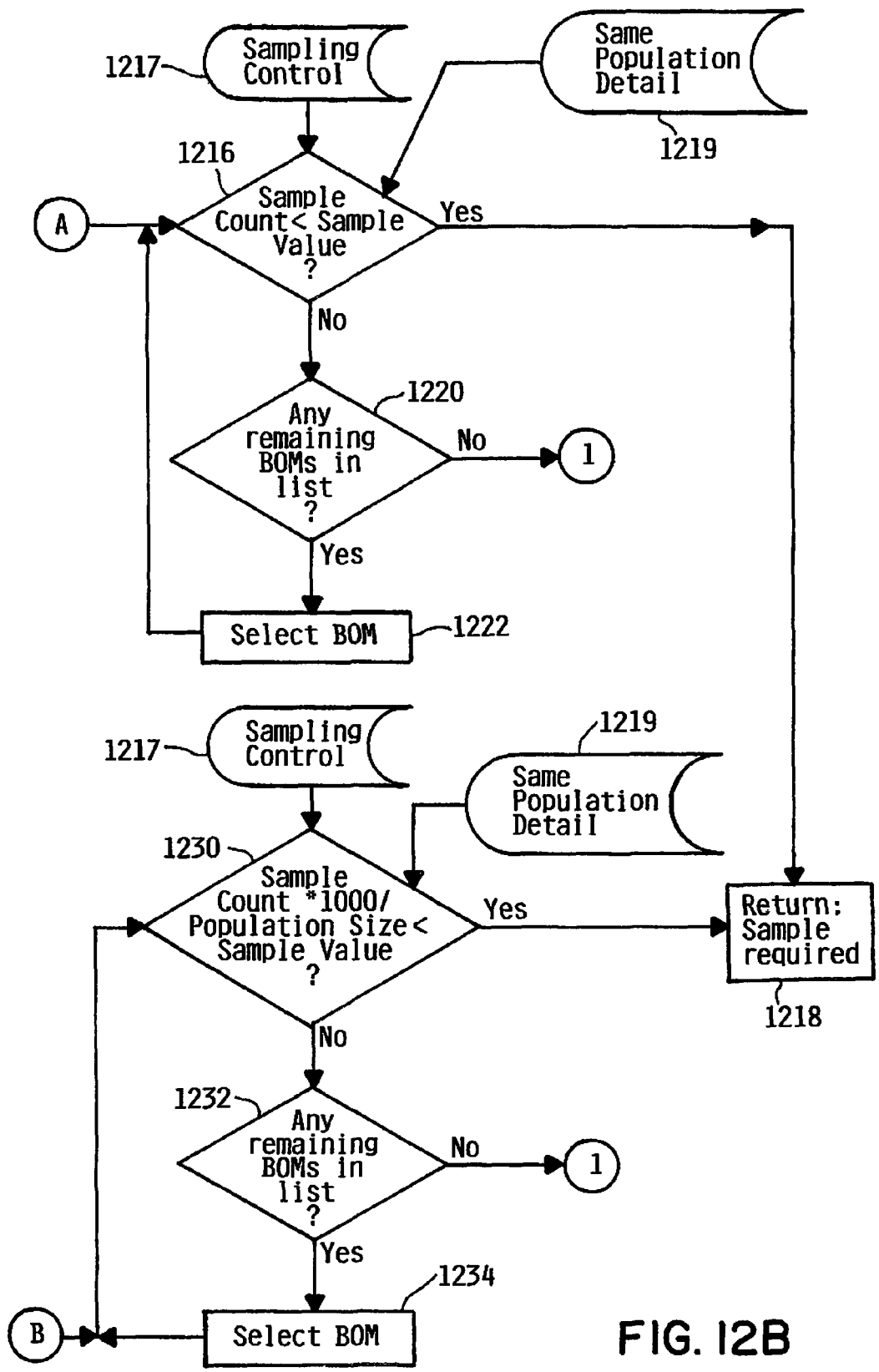

FIG. 12 illustrates the operation of block 1115 in more detail. At block 1203, the RATE program 122b determines what type of sampling is requested by the call, and then selects matching sampling control records. Next, at block 1204, the RATE program 122b determines if any sampling programs have been previously set up. If so, then the RATE program 122b determines if there are any remaining sampling control records (a table in which users identify what type of sampling to initiate, at what operation, for which products, and the corresponding sampling parameters, not shown) at block 1206, otherwise the RATE program 122b replies at block 1208 that 'no sample' is required and exits. If RATE program 122b determined at block 1206 that sampling control records remain, then the RATE program 122b selects the relevant sampling control records at block 1210; otherwise the RATE program 122b replies that no sample is required at block 1208 and exits.

At block 1214, the RATE program 122b determines whether 'qualify' or 'rate' sampling was specified. If 'qualify' was specified, then the RATE program 122b determines at block 1216 whether the current sample count is less then the required sample value. This determination may include querying the sampling control records 1217 (a table in which users identify what type of sampling to initiate, at what operation, for which assemblies, and the corresponding sampling parameters) and a sample population information table 1219 (tracks sample population per attribute used in determining sample selection). If the current sample count is less then the required sample value, then the RATE program 122b returns that 'a sample is required' at block 1218; otherwise, the RATE program 122b iterates through the remaining bills of materials (BOM) for the assembly to determine if any remain at blocks 1220-1222. If the sample count is less then the sample value and no remaining BOM's remain in the list, then the RATE program 122b will return to block 1206.

If 'rate' was specified at block 1204, then the RATE program 122b determines at block 1230 whether the sample count/population size is less then the required sampling rate. If so, then the RATE program 122b returns a sample required message at block 1218, otherwise the RATE program 122b iterates through the remaining bills of materials (BOM) for the assembly 190 to determine if any remain at blocks 1232-1234. If the required rate has been satisfied and no remaining BOM's remain in the list, then the RATE program 122b will return to block 1206.

Referring again to FIGS. 1A-1C, the computing system 100 in this embodiment comprises a plurality of central processing units 110a-110d (herein generically referred to as a processor 110 or a CPU 110) connected to a main memory unit 112, a mass storage interface 114, a terminal/display interface 116, a network interface 118, and an input/output ("I/O") interface 120 by a system bus 119. The mass storage interfaces 114, in turn, connect the system bus 119 to one or more mass storage devices, such as a direct access storage device 140 or a readable/writable optical disk drive 542. The network interfaces 118 allow the computer system 100 to communicate with other computing systems 100 over the communications medium 106.

The computing system 100 in this embodiment is a general-purpose computing device. Accordingly, the CPU's 110 are capable of executing program instructions stored in the main memory 112 and are constructed from one or more microprocessors and/or integrated circuits. Moreover, in this embodiment, the computing system 100 contains multiple processors and/or processing cores, as is typical of larger, more capable computer systems. However, in other embodiments, the computing systems 100 may comprise, in whole or in part, a single processor system; a single processor designed to emulate a multiprocessor system; or special purpose processing devices, such as an application specific integrated circuit (ASIC).

When the computing system 100 starts up, the associated processor(s) 110 initially execute the program instructions that make up the operating system 124, which in turn, manages the physical and logical resources of the computer system 100. These resources include the main memory 112, the mass storage interface 114, the terminal/display interface 116, the network interface 118, and the system bus 119. As with the processor(s) 110, some computer system 100 embodiments may utilize multiple system interfaces 114, 116, 118, 120, and busses 122, which in turn, may each include their own separate, fully programmed microprocessors.

The system bus 119 may be any device that facilitates communication between and among the processors 110; the main memory 112; and the interfaces 114, 116, 118, 120. Those skilled in the art will appreciate that the system bus 119 may be a relatively simple, single bus structure that provides a direct communication path among the system bus 119 (as depicted in FIG. 1A), or may be a more complex structure, such as point-to-point links in hierarchical, star or web configurations; multiple hierarchical buses; parallel and redundant paths, etc.

The main memory 112 and the mass storage devices 140 work cooperatively in this embodiment to store the operating system 124, the MES 126, the WIP database 128, the sampling programs 122. In this embodiment, the main memory 112 is a random-access semiconductor device capable of storing data and programs. Although FIG. 1A conceptually depicts this device as a single monolithic entity, the main memory 112 in some embodiments may be a more complex arrangement, such as a hierarchy of caches and other memory devices. Thus, for example, the main memory 112 may comprise multiple levels of caches, and these caches may be further divided by function, so that one cache holds instructions while another holds non-instruction data, which is used by the processor or processors. The memory may be further distributed and associated with different CPUs 110 or sets of CPUs 110, as is known in any of various so-called non-uniform memory access (NUMA) computer architectures. Moreover, some embodiments may utilize virtual addressing mechanisms that allow the computing systems 100 to behave as if it has access to a large, single storage entity instead of access to multiple, smaller storage entities such as the main memory 112 and the mass storage device 140.

Moreover, while the operating system 124, the MES 126, the WIP database 128, and the sampling programs 122 are illustrated as being contained within the main memory 112, some or all of them may be physically located on different computer systems and may be accessed remotely, e.g., via a communications medium, such as the Internet. That is, while the operating system 124, the MES 126, the WIP database 128, and the sampling programs 122 are illustrated as being contained within the main memory 112, these elements are not necessarily all completely contained in the same physical device at the same time, and may even reside in the virtual memory of other computer systems 100. Such arrangements are common in virtualized and cloud-based embodiments.

The system interface units 114, 116, 118, 120 support communication with a variety of storage and I/O devices, including the managed stations 191. More specifically, the mass storage interface unit 114 supports the attachment of one or more mass storage devices 140, which are typically rotating magnetic disk drive storage devices, although they could alternatively be other devices, including arrays of disk drives configured to appear as a single large storage device to a host and/or archival storage media, such as hard disk drives, tape (e.g., mini-DV), writeable compact disks (e.g., CD-R and CD-RW), digital versatile disks (e.g., DVD, DVD-R, DVD+R, DVD+RW, DVD-RAM), holography storage systems, blue laser disks, IBM Millipede devices and the like.

The terminal/display interface 116 directly connects one or more display units 199 to the computer system 100. These display units 180 may be non-intelligent (i.e., dumb) terminals, such as a cathode ray tube, or may themselves be fully programmable workstations used to allow IT administrators and users to communicate with the computing system 100. Note, however, that while the interface 116 is provided to support communication with one or more displays 180, the computer systems 100 does not necessarily require a display 180 because all needed interaction with users and other processes may occur via network interface 118.

The communications medium may be any suitable network or combination of networks and may support any appropriate protocol suitable for communication of data and/or code to/from multiple computing systems 100. Accordingly, the network interfaces 118 can be any device that facilitates such communication, regardless of whether the network connection is made using present day analog and/or digital techniques or via some networking mechanism of the future. Those skilled in the art will appreciate that many different network and transport protocols can be used to implement the network. The Transmission Control Protocol/Internet Protocol ("TCP/IP") suite contains suitable network and transport protocols.

The computing system 100 in FIGS. 1A-1C is depicted with multiple attached terminals 180, such as might be typical of a multi-user "mainframe" computer system. In such a case, the actual number of attached devices is typically greater than those shown in FIG. 1A, although the present invention is not limited to systems of any particular size. The computing systems 100 may alternatively be a single-user system, typically containing only a single user display and keyboard input, or might be a server or similar device which has little or no direct user interface, but receives requests from other computer systems (clients). One exemplary computing system 100 is the IBM Power® platform running the i5/OS® multitasking operating system, both of which are available from International Business Machines Corporation of Armonk, N.Y. However, those skilled in the art will appreciate that the methods, systems, and apparatuses of the present invention apply equally to any computing system 100 and operating system combination, regardless of whether one or both of the computer systems 100 and terminals 180 are complicated multi user computing apparatuses, a single workstations, lap-top computers, mobile telephones, personal digital assistants ("PDAs"), video game systems, embedded computer systems, appliances, tablet computer, pocket computer, telephone, pager, automobile, teleconferencing system, appliance, or any other appropriate type of electronic device, or the like.

Although the present invention has been described in detail with reference to certain examples thereof, it may be also embodied in other specific forms without departing from the essential spirit or attributes thereof. For example, those skilled in the art will appreciate that the present invention is capable of being distributed as a program product in a variety of forms, and applies equally regardless of the particular type of computer-readable signal bearing medium used to actually carry out the distribution. Examples of tangible, computer-readable signal bearing media include, but are not limited to: (I) read-only storage media (e.g., read only memory devices ("ROM"), CD-ROM disks readable by a CD drive, and Digital Versatile Disks ("DVDs") readable by a DVD drive); (ii) writable and rewriteable storage media (e.g., floppy disks readable by a diskette drive, CD-R and CD-RW disks readable by a CD drive, random access memory ("RAM"), and hard disk drives). Examples of communication signal bearing media include, but are not limited to: (i) computer networks, such as those implemented using "Infiniband" or IEEE 802.3x "Ethernet" specifications; (ii) telephone networks, including cellular transmission networks; and (iii) wireless networks, such as those implemented using the IEEE 802.11x, IEEE 802.16, General Packet Radio Service ("GPRS"), Family Radio Service ("FRS"), and Bluetooth specifications). Those skilled in the art will appreciate that these embodiments specifically include computer software downloaded over the Internet.

The present invention may also be embodied part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. These service engagement embodiments may be directed at providing complete manufacturing solutions, to providing only information services, or some combination thereof.

The accompanying figures and this description depicted and described embodiments of the present invention, and features and components thereof. Those skilled in the art will appreciate that any particular program nomenclature used in this description was merely for convenience, and thus the invention should not be limited to use solely in any specific application identified and/or implied by such nomenclature. Thus, for example, the routines executed to implement the embodiments of the invention, whether implemented as part of an operating system or a specific application, component, program, module, object, or sequence of instructions could have been referred to as a "program", "application", "server", or other meaningful nomenclature. Indeed, other alternative hardware and/or software environments may be used without departing from the scope of the invention. Likewise, reference to "the invention" shall not be construed as a generalization of any inventive subject matter disclosed herein and shall not be considered to be an element or limitation of the appended claims except where explicitly recited in a claim(s). Therefore, it is desired that the embodiments described herein be considered in all respects as illustrative, not restrictive, and that reference be made to the appended claims for determining the scope of the invention.

What is claimed is:

1. A computer-implemented method for dynamically generating a manufacturing production work flow, comprising:
receiving indication that an assembly has completed a manufacturing operation, the assembly having a manufacturing production work flow with a route between a plurality of manufacturing operations;
selecting a sampling strategy having at least one sampling dimension program for the assembly after completing the manufacturing operation by matching characteristics of the assembly and the manufacturing production work flow with characteristics of a sampling strategy within a database having a plurality of sampling strategies;
discovering at least one of the subsequent manufacturing operations of the manufacturing production invokes a sampling operation of the at least one sampling dimension program;
querying a data source for characteristics of a plurality of previously sampled assemblies that have completed the manufacturing operation;
querying a manufacturing floor control system for a current production status;
running the sampling dimension program that suggests updates to the work flow with sampling operations; and
dynamically updating the work flow for the assembly by changing the route of the work flow between the completed manufacturing operation and a subsequent manufacturing operation of the assembly based at least in part on the sampling strategy, the characteristics of the plurality of previously sampled assemblies, the current production status, and the suggested updates of the sampling dimension program.

2. The method of claim 1, wherein the characteristics of the plurality of previously sampled assemblies comprise a sampling history of related assemblies to the assembly.

3. The method of claim 1, further comprising assigning each assembly a fingerprint, wherein each fingerprint corresponds with at least a model number, feature code, and quantity, wherein identical assemblies are assigned identical fingerprints, and wherein dynamically updating is further based at least in part on an assigned fingerprint.

4. The method of claim 2, wherein the sampling history of the related assemblies further comprises a test result and an expiration date, wherein if past the expiration date signals dynamically updating the work flow.

5. The method of claim 1, wherein the assembly is a server.

6. The method of claim 1, wherein the current production status comprises a production deadline; and wherein dynamically updating a work flow comprises removing one or more manufacturing operations when the work flow will not be completed before the production deadline.

7. The method of claim 1, wherein dynamically updating a work flow is further based on a sampling history for the assembly.

8. The method of claim 1, wherein dynamically updating the work flow for the assembly includes at least one of adding and removing a second manufacturing operation.

9. The method of claim 8, wherein the second manufacturing operation is a sampling operation.

10. The method of claim 1, wherein the dynamically updating the work flow comprises creating a new work flow by changing the route of the work flow between the completed manufacturing operation and a subsequent manufacturing operation, wherein the new work flow is not selected from a pre-defined set of choices.

11. The method of claim 1, wherein the assembly comprises a plurality of sub-assemblies, each sub-assembly having a work flow and a sampling strategy associated therewith; and further comprising dynamically updating the work flow for the assembly based at least in part on the work flow and sampling strategies for the plurality of sub-assemblies.

12. The method of claim 1, further comprising issuing production work orders to adjust the production work flow according to the dynamically updated work flow.

13. The method of claim 1, wherein the assembly is associated with two or more sampling strategies and wherein dynamically updating the work flow for the assembly is based at least in part on an overlap of the two or more sampling strategies.

14. A method for deploying computing infrastructure, comprising integrating computer readable program code into a computing system, wherein the code in combination with the computing system is adapted to perform a method for generating a manufacturing production work flow, comprising:
- receiving indication that an assembly has completed a manufacturing operation, the assembly having a manufacturing production work flow with a route between a plurality of manufacturing operations;
- selecting a sampling strategy having at least one sampling dimension program for the assembly after completing the manufacturing operation by matching characteristics of the assembly and the manufacturing production work flow with characteristics of a sampling strategy within a database having a plurality of sampling strategies;
- discovering at least one of the subsequent manufacturing operations of the manufacturing production invokes a sampling operation of the at least one sampling dimension program;
- querying a data source for characteristics of a plurality of previously sampled assemblies that have completed the manufacturing operation;
- querying a manufacturing floor control system for a current production status;
- running the sampling dimension program that suggests updates to the work flow with sampling operations; and
- dynamically updating the work flow for the assembly by changing the route of the work flow between the completed manufacturing operation and a subsequent manufacturing operation of the assembly based at least in part on the sampling strategy, the characteristics of the plurality of previously sampled assemblies, the current production status, and the suggested updates of the sampling dimension program.

15. The method of claim 14, further comprising:
- storing the computer readable program code in an internet accessible storage media;
- receiving a request for the computer readable program code from a computing device; and
- in response to the request, transmitting the computer readable program code to the computing device.

16. A system, comprising:
a processing unit; and
a memory operatively connected to the processing unit, the memory containing an adaptive engine configured to:
- receive indication that an assembly has completed a manufacturing operation, the assembly having a manufacturing production work flow with a route between a plurality of manufacturing operations;
- select a sampling strategy having at least one sampling dimension program for the assembly after completing the manufacturing operation by matching characteristics of the assembly and the manufacturing production work flow with characteristics of a sampling strategy within a database having a plurality of sampling strategies;
- discover at least one of the subsequent manufacturing operations of the manufacturing production invokes a sampling operation of the at least one sampling dimension program;
- query a data source for characteristics of a plurality of previously sampled assemblies that have completed the manufacturing operation;
- query a manufacturing floor control system for a current production status;
- run the sampling dimension program that suggests updates to the work flow with sampling operations; and
- dynamically update the work flow for the assembly by changing the route of the work flow between the completed manufacturing operation and a subsequent manufacturing operation of the assembly based at least in part on the sampling strategy, the characteristics of the plurality of previously sampled assemblies, the current production status, and the suggested updates of the sampling dimension program.

17. The system of claim 16, wherein the sampling strategy comprises a rate/qualify strategy.

18. The system of claim 16, wherein the sampling strategy comprises a first-off test strategy.

19. The system of claim 16, wherein dynamically updating the work flow for the assembly includes at least one of adding and removing a second manufacturing operation.

20. The system of claim 16, wherein the adaptive engine is further configured to issue production work orders to adjust the production work flow according to the dynamically updated work flow.

21. The system of claim 16, wherein the assembly is associated with two or more sampling strategies; and wherein dynamically updating the work flow for the assembly is based at least in part on an overlap of the two or more sampling strategies.

\* \* \* \* \*